US010304397B2

(12) United States Patent
Kim et al.

(10) Patent No.: US 10,304,397 B2
(45) Date of Patent: May 28, 2019

(54) DISPLAY DEVICE

(71) Applicant: Samsung Display Co., Ltd., Yongin-Si, Gyeonggi-Do (KR)

(72) Inventors: Sungman Kim, Seoul (KR); Wonho Kim, Seongnam-si (KR); Junho Song, Seongnam-si (KR); Seongsu Lim, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 7 days.

(21) Appl. No.: 15/645,161

(22) Filed: Jul. 10, 2017

(65) Prior Publication Data

US 2018/0033383 A1 Feb. 1, 2018

(30) Foreign Application Priority Data

Jul. 26, 2016 (KR) ........................ 10-2016-0094976

(51) Int. Cl.
*G06F 1/00* (2006.01)
*G09G 3/36* (2006.01)

(52) U.S. Cl.
CPC ......... *G09G 3/3614* (2013.01); *G09G 3/3607* (2013.01); *G09G 3/3648* (2013.01); *G09G 3/3677* (2013.01); *G09G 2300/0426* (2013.01); *G09G 2300/0452* (2013.01); *G09G 2300/0823* (2013.01); *G09G 2320/0214* (2013.01); *G09G 2320/0233* (2013.01); *G09G 2320/0247* (2013.01)

(58) Field of Classification Search
CPC .......... G09G 3/34; G09G 3/36; G09G 3/3688; G09G 3/3677; G09G 3/3614; G09G 3/3607
See application file for complete search history.

(56) References Cited

U.S. PATENT DOCUMENTS

| | | | | |
|---|---|---|---|---|
| 2017/0039928 | A1* | 2/2017 | Zhang | G09G 3/003 |
| 2017/0345382 | A1* | 11/2017 | Sang | G02F 1/13 |

FOREIGN PATENT DOCUMENTS

| | | | |
|---|---|---|---|
| KR | 100874640 | B1 | 12/2008 |
| KR | 1020110006770 | A | 1/2011 |
| KR | 101364876 | B1 | 2/2014 |
| KR | 1020150144897 | A | 12/2015 |
| KR | 1020160043177 | A | 4/2016 |
| KR | 1020160066654 | A | 6/2016 |
| KR | 101675839 | B1 | 11/2016 |

* cited by examiner

*Primary Examiner* — Michael A Faragalla
(74) *Attorney, Agent, or Firm* — Cantor Colburn LLP

(57) ABSTRACT

The display device includes a plurality of gate lines extending in a first direction, a plurality of data lines extending in a second direction intersecting the first direction, and a plurality of pixels connected to the gate lines and the data lines. A plurality of dots is defined by the pixels, each of the dots includes first to fourth pixels in a same pixel column arranged in the second direction, and the first to fourth pixels display first to fourth colors, respectively. The first to fourth pixels are connected to two or three gate lines among the gate lines. Three pixels among the first to fourth pixels have a same polarity, and the remaining one pixel among the first to fourth pixels has a different polarity than the three pixels.

20 Claims, 18 Drawing Sheets

DISPLAY DEVICE

This application claims priority to Korean Patent Application No. 10-2016-0094976, filed on Jul. 26, 2016, and all the benefits accruing therefrom under 35 U.S.C. § 119, the content of which in its entirety is herein incorporated by reference.

BACKGROUND

1. Field

The disclosure herein relates to a display device, and more particularly, to a display device with improved image quality.

2. Description of the Related Art

A liquid crystal display device typically generates an electric filed in a liquid crystal layer disposed between two substrates and changes an arrangement state of liquid crystal molecules, thereby adjusting the transmittance of incident light to display an image.

A driving method of a liquid crystal display device may include a line inversion method, a column inversion method and a dot inversion method, for example, depending on the phase of a data voltage applied to a data line. The line inversion method is a method of reversing and applying the phase of image data applied to a data line by each pixel row. The column version method is a method of reversing and applying the phase of image data applied to a data line by each pixel column. The dot inversion method is a method of reversing and applying the phase of image data applied to a data line by each pixel row and each pixel column.

In general, a display device expresses colors by using the three primary colors of red, blue and green. Therefore, the display panel includes pixels that respectively correspond to red, blue and green. Recently, a display device for displaying colors by using red, blue, green, and white colors is suggested.

SUMMARY

The disclosure provides a display device for improving an image quality in a structure including four pixels with respective four colors.

According to an embodiment of the invention, a display device includes a plurality of gate lines extending in a first direction, a plurality of data lines extending in a second direction intersecting the first direction, and a plurality of pixels connected to the gate lines and the data lines. In such an embodiment, a plurality of dots is defined by the pixels, each of the dots includes first to fourth pixels arranged in the second direction, and the first to fourth pixels display first to fourth colors, respectively. In such an embodiment, the first to fourth pixels are connected to two or three gate lines among the gate lines. In such an embodiment, three pixels among the first to fourth pixels have a same polarity as each other, and the remaining one pixel among the first to fourth pixels has a different polarity than the three pixels.

BRIEF DESCRIPTION OF THE FIGURES

The accompanying drawings are included to provide a further understanding of the inventive concept, and are incorporated in and constitute a part of this specification. The drawings illustrate exemplary embodiments of the invention and, together with the description, serve to explain principles of the invention. In the drawings:

FIG. 5D is a schematic circuit diagram illustrating a state in which the first to fourth pixels shown in FIG. 3 are turned on;

DETAILED DESCRIPTION

Figure 1:
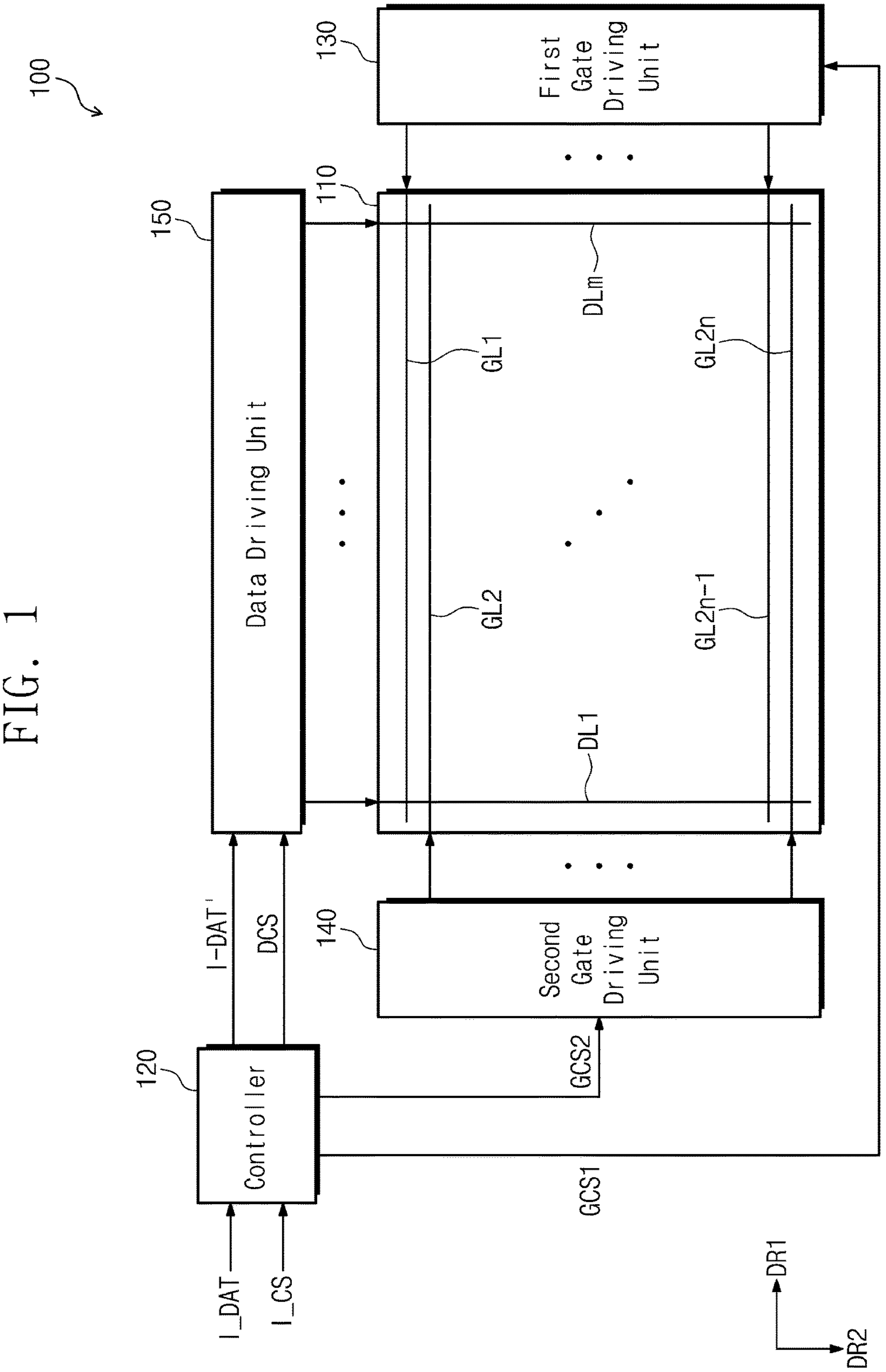
FIG. 1 is a schematic block diagram of a liquid crystal display device according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the invention will be described in detail with reference to the accompanying drawings.

Figure 2:
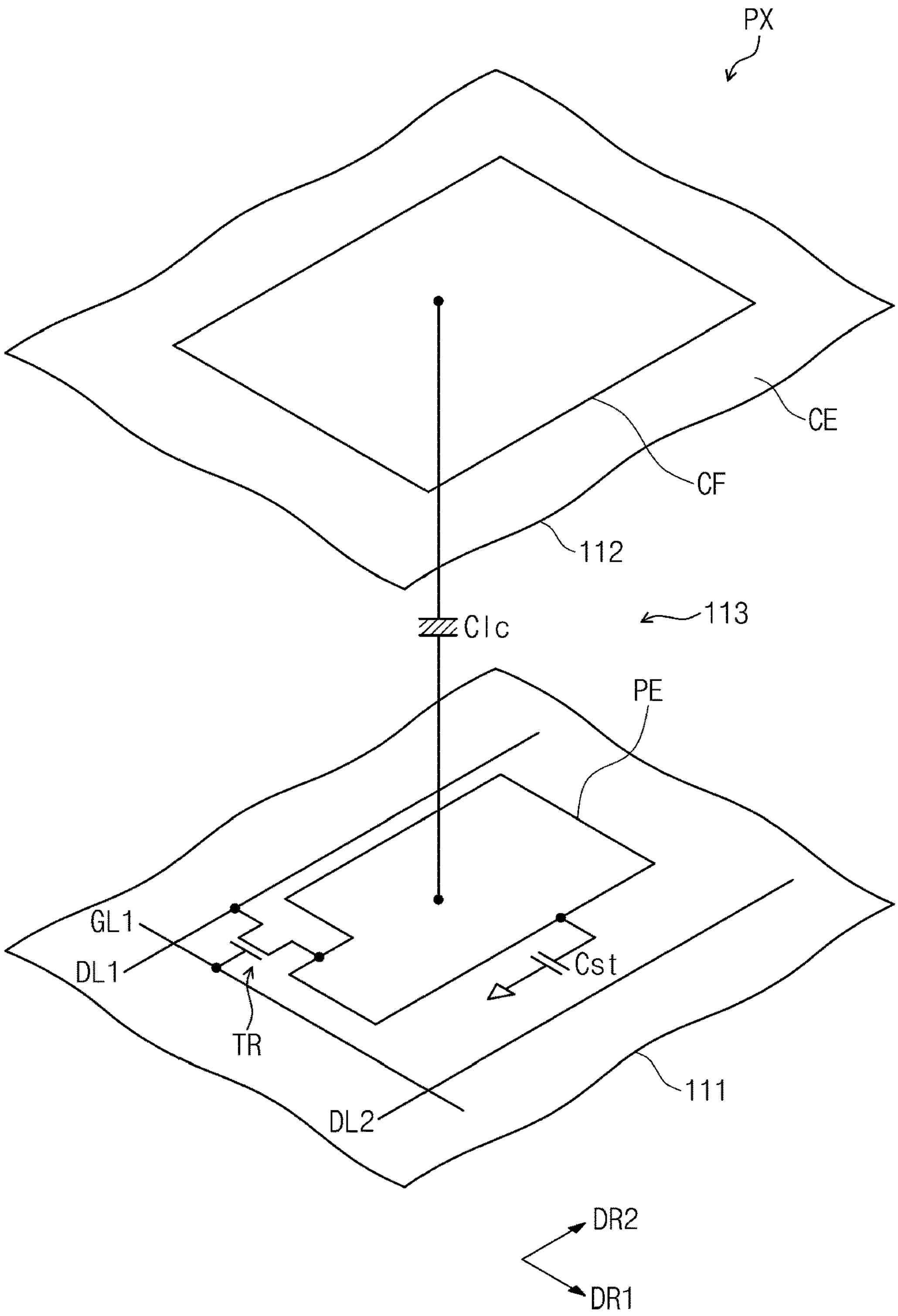
FIG. 2 is an equivalent circuit diagram of a pixel shown in FIG. 1.

FIG. 1 is a schematic block diagram of a display device according to an embodiment of the invention and FIG. 2 is an equivalent circuit diagram of one pixel shown in FIG. 1.

Referring to FIG. 1, an embodiment of a liquid crystal display 100 includes a liquid crystal panel 110, a controller 120, a first gate driving unit (or a first gate driver) 130, a second gate driving unit (or a second gate driver) 140, and a data driving unit (or a data driver) 150.

The liquid crystal panel 110 may include a lower substrate 111, an upper substrate 112 facing the lower substrate 111, and a liquid crystal layer 113 disposed between the two substrates 111 and 112.

The liquid crystal panel 110 includes a plurality of gate lines GL1 to GL2*n* extending in a first direction DR1 and a plurality of data lines DL1 to DLm extending in a second direction DR2 intersection the first direction DR1. The gate lines GL1 to GL2*n* and the data lines DL1 to DLm define pixel regions and pixels PX for displaying an image are provided or disposed in a one-to-one correspondence with the pixel regions. FIGS. 1 and 2 show a pixel connected to a first gate line GL1 and a first data line DL1 among the plurality of pixels PX.

Referring to FIGS. 1 and 2, the pixel PX includes a thin film transistor TR connected to the first gate line GL1 and the first data line DL1, a liquid crystal capacitor Clc connected to the thin film transistor TR, and a storage capacitor Cst connected in parallel to the liquid crystal capacitor Clc. Alternatively, the storage capacitor Cst may be omitted. In such an embodiment, a pixel electrode PE disposed on the lower substrate 111 and a common electrode CE disposed on the upper substrate 112 defines two terminals of the liquid crystal capacitor Clc, and the liquid crystal layer 113 between the pixel and common electrodes PE and CE functions as a dielectric.

The thin film transistor TR may be disposed on the lower substrate 111. The gate electrode of the thin film transistor TR may be connected to the first gate line GL1, the source electrode may be connected to the first data line DL1, and the drain electrode may be connected to the pixel electrode PE. The common electrode CE is disposed on the upper substrate 112 to substantially entirely cover the upper substrate 112, and receives a common voltage.

In an alternative embodiment, the common electrode CE may be disposed on the lower substrate 111. In such an embodiment, at least one of the pixel and common electrodes PE and CE may include a slit.

The storage capacitor Cst may serve as an auxiliary of the liquid crystal capacitor Clc and include the pixel electrode PE, a storage line (not shown), and an insulator disposed between the pixel electrode PE and the storage line. The storage line may be disposed on the lower substrate 110 to overlap a part of the pixel electrode PE. A constant voltage such as a storage voltage is applied to the storage line.

In an alternative embodiment, the liquid crystal display device 100 may have a visibility structure in which each of the pixels PX is divided into two grayscale regions. In the visibility structure, each of the pixels PX includes at least two sub-pixels, and each of the two sub-pixels may receive a data voltage based on a different gamma curve and display different grayscales for a same input image data.

The pixels PX may display one of primary colors. The primary colors may include red, green, blue and white. The pixels PX may further display yellow, cyan and magenta colors. Each of the pixels PX may further include a color filter CF that represents one of the primary colors. In an embodiment, as shown in FIG. 2, the color filter CF may be disposed on the upper substrate 112, but the invention is not limited thereto. Alternatively, the color filter CF may be disposed on the lower substrate 111.

The controller 120 receives image data I-DAT and a control signal I-CS from an external graphic control unit (not shown). The control signal I-CS includes a vertical synchronization signal that is a frame discrimination signal, a horizontal synchronization signal that is a row discrimination signal, a data enable signal having a high level only during a section where data is outputted in order to display an area where data is inputted, and a main clock signal.

The controller 120 converts the image data I-DAT to match the specifications of the data driving unit 150 and outputs the converted image data I-DAT' to the data driving unit 150. The controller 120 generates a data control signal DCS, and first and second gate control signals GCS1 and GCS2, based on the control signal I-CS. The controller 120 outputs the first and second gate control signals GCS1 and GCS2 to the first and second gate driving units 130 and 140, respectively, and outputs the data control signal DCS to the data driving unit 150.

The first and second gate control signals GCS1 and GCS2 are signals for driving the first and second gate driving units 130 and 140, respectively.

The first gate driver 130 is electrically connected to the gate lines of a first group among the plurality of gate lines GL1 to GL2*n* of the liquid crystal panel 110, and the second gate driving unit 140 is electrically connected to the gate lines of a second group among the plurality of gate lines GL1 to GL2*n*. In an embodiment of the invention, the gate lines of the first group are odd gate lines (i.e., odd-numbered gate lines), and the gate lines of the second group are even gate lines (i.e., even-numbered gate lines).

The first gate driving unit 130 generates odd gate signals (i.e., odd-numbered gate signals) in response to the first gate control signal GCS1 and sequentially outputs the odd gate signals to the gate lines of the first group. The second gate driver 140 generates even gate signals (i.e., even-numbered gate signals) in response to the second gate control signal GCS2, and sequentially outputs the even gate signals to the gate lines of the second group.

The data control signal DCS is a signal for driving the data driving unit 150.

The data driving unit 150 converts the image data I-DAT' into a corresponding grayscale voltage in response to the data control signal DCS, and outputs the grayscale voltage to the corresponding data line among the data lines DL1 to DLm as a data voltage. The data voltage may include a positive data voltage having a positive value with respect to a common voltage and a negative data voltage having a negative value with respect to the common voltage.

The polarity of a data voltage applied to the pixels PX may be inverted before one frame ends and the next frame starts to prevent the deterioration of a liquid crystal. In an embodiment, the polarity of a voltage may be inverted by one frame unit or on a frame-by-frame basis in response to an inversion signal applied to the data driving unit 150. The liquid crystal panel 110 may be driven in a manner that data voltages of different polarities are applied by at least one data line unit to improve the image quality when displaying an image of one frame.

In one embodiment, for example, each of the controller 120, the first and second gate drivers 130 and 140, and the data driving unit 150 may be directly mounted on the liquid crystal panel 100 in the form of an integrated circuit chip, or may be mounted on a flexible printed circuit board to be attached to the liquid crystal panel 110 in the form of a tape carrier package ("TCP"), or may be mounted on a separate printed circuit board. Alternatively, the first and second gate driving units 130 and 140 may be integrated into the liquid crystal panel 110 together with the gate lines GL1 to GL2*n* and the thin film transistor TR. In an alternative embodiment, the controller 120, the data driving unit 150, and the first and second gate driving units 130 and 140 may be integrated in a single chip.

The liquid crystal display device 100 may further include a backlight unit disposed under the liquid crystal panel 110, e.g., on a rear surface of the liquid crystal panel 110. The backlight unit on the rear surface of the liquid crystal panel 110 generates light. The backlight unit may include a light emitting diode as a light source.

Figure 3:
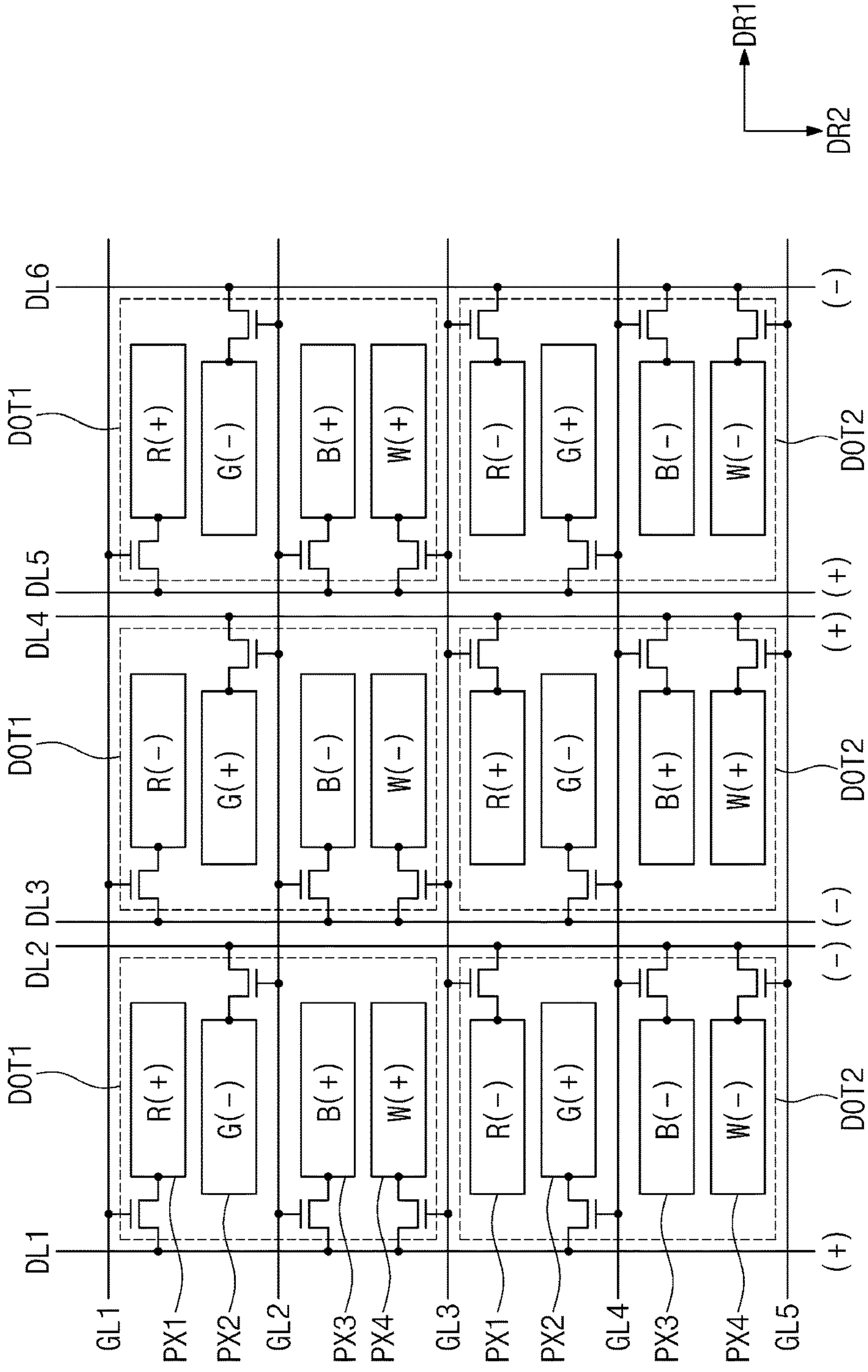
FIG. 3 is a schematic circuit diagram illustrating a part of a liquid crystal panel according to an embodiment of the invention.

FIG. 3 is a schematic circuit diagram illustrating a part of a liquid crystal panel according to an embodiment of the invention.

Referring to FIG. 3, a plurality of pixels is arranged in a matrix form in the first direction DR1 and the second direction DR2. For convenience of description, a set of pixels arranged in the first direction DR1 is defined as a pixel row, and a set of pixels in the second direction DR2 is defined as a pixel column.

FIG. 3 shows the first to fifth gate lines GL1 to GL5 among the plurality of gate lines GL1 to GL2*n* (see FIG. 1), and the first to sixth data lines DL1 to DL6 among the plurality of data lines DL1 to DLm.

The first to fifth gate lines GL1 to GL5 extend in the first direction DR1 and are arranged in the second direction DR2. The first to sixth data lines DL1 to DL6 extend in the second direction DR2 and are arranged in the first direction DR1.

In an embodiment, as shown in FIG. 3, a dot defined by pixels, e.g., four pixels, is defined. In one embodiment, for example, the dot includes a first dot DOT1 and a second dot DOT2. The first dot DOT1 and the second dot DOT2 are alternately arranged in the second direction DR2. The same dots may be arranged in the first direction DR1.

Each of the first and second dots DOT1 and DOT2 may include first to fourth pixels PX1, PX2, PX3, and PX4 sequentially arranged in the second direction DR2. The first to fourth pixels PX1, PX2, PX3, and PX4 may have different colors from each other. Here, a color represented by the first pixel PX1 is defined as a first color, a color represented by the second pixel PX2 is defined as a second color, a color represented by the third pixel PX3 is defined as a second color, and a color represented by the fourth pixel PX4 may be defined as a fourth color. In one embodiment, for example, the first to fourth colors may be any one of red, green, blue and white colors, but are not limited thereto. Alternatively, the first to fourth colors may be any one of red, green, blue, and yellow. Hereinafter, for convenience of description, an embodiment where the first color is a red color, the second color is a green color, the third color is a blue color, and the fourth color is a white color, as shown in FIG. 3, will be described in detail.

Pixels on a same pixel row display a same color. In one embodiment, for example, as shown in FIG. 3, the pixels of the first pixel row among the plurality of pixel rows display red color, the pixels of the second pixel row display the green color, the pixels of the third pixel row display a blue color, and the pixels of the fourth pixel row display a white color.

The representative color of each of the first and second dots DOT1 and DOT2 may be determined by a combination of the first to fourth pixels PX1, PX2, PX3 and PX4. The first and second dots DOT1 and DOT2 are provided in plurality and arranged in a matrix. FIG. 3 merely shows six dots for convenience of illustration.

The first to fourth pixels PX1, PX2, PX3 and PX4 may be divided and connected to two or three gate lines. In one embodiment, for example, as shown in FIG. 3, the first to fourth pixels PX1, PX2, PX3, and PX4 are divided and connected to three gate lines, but the invention is not limited thereto. In one alternative embodiment, for example, the first to fourth pixels PX1, PX2, PX3, and PX4 may be divided and connected two gate lines. In such an embodiment, referring to FIG. 3, the first and second pixels PX1, PX2 of the first to fourth pixels PX1, PX2, PX3, and PX4 may be connected to the first gate line GL1, and the third and fourth pixels PX3, PX4 of the first to fourth pixels PX1, PX2, PX3, and PX4 may be connected to the first gate line GL2.

In such an embodiment, the first to fourth pixels PX1, PX2, PX3, and PX4 are divided and connected to three or less gate lines.

The pixels of the i-th row and the pixels of the (i+1)-th row are connected to a same gate line. Here, i may be a natural number of 2 or greater. In such an embodiment, as shown in FIG. 3, the pixels of the second row and the pixels of the third row share the second gate line GL2, the pixels of the fourth row and the pixels of the fifth row share the third gate line GL3, and the pixels of the sixth row and the pixels of the seventh row share the fourth gate line GL4.

In an embodiment, two pixels connected to a same gate line among the first to fourth pixels PX1, PX2, PX3, and PX4 are connected to different data lines from each other. In such an embodiment, two pixels sharing a same gate line among the first to fourth pixels PX1, PX2, PX3, and PX4 are connected to different data lines.

In an embodiment, when the first or second dot DOT1 or DOT2 is located between the k-th data line and the (k+1)-th data line (k is an integer of 1 or greater), three pixels among the first to fourth pixels PX1, PX2, PX3 and PX4 thereof are connected to one of the k-th data line and the (k+1)-th data line. In such an embodiment, the remaining one pixel among the first to fourth pixels PX1, PX2, PX3, and PX4 thereof is connected to the other of the k-th data line and the (k+1)-th data line.

In an embodiment, as shown in FIG. 3, the second and third pixels PX2 and PX3 sharing the second gate line GL2 among the first to fourth pixels PX1, PX2, PX3, and PX4 of the first dot DOT1 are connected to different data lines. In such an embodiment, when the second pixel PX2 in the first pixel column disposed between the first and second data lines DL1 and DL2 may be connected to the second data line DL2, the third pixel PX3 may be connected to the first data line DL1.

In such an embodiment, the first, third and fourth pixels PX1, PX3 and PX4 of the first dot DOT1 in the first pixel column are connected to the first data line DL1, and the second pixel PX2 of the first dot DOT1 is connected to the second data line DL2. In such an embodiment, the first, third, and, fourth pixels PX1, PX3, and PX4 of the second dot DOT2 in the first pixel column are connected to the second data line DL2, and the second pixel PX2 of the second dot DOT2 is connected to the first data line DL1.

Data voltages of different polarities are applied to the k-th data line and the (k+1)-th data line. In an embodiment, as shown in FIG. 3, when a data signal of a (+) polarity is applied to the first data line DL1, a data voltage of a (−) polarity is applied to the second data line DL2.

Therefore, the first, third and fourth pixels PX1, PX3 and PX4 connected to the first data line DL1 among the first to fourth pixels PX1, PX2, PX3 and PX4 have the (+) polarity, and the second pixel PX2 has a (−) polarity different from that of the first, third and fourth pixels PX1, PX3 and PX4.

Accordingly, in such an embodiment, the first dot DOT1 has the polarity arrangement (or sequence) of a first pattern, and the second dot DOT2 has the polarity arrangement of a second pattern. In one embodiment, for example, the first pattern may have any one polarity pattern among (+)(−)(+)(+), (+)(+)(−)(+), (−)(+)(+)(+), and (+)(+)(+)(−), and the second pattern may have a pattern inverted from the first pattern. In FIG. 3, the first dot DOT1 has the first pattern of (+)(−)(+)(+) and the second dot DOT2 has the second pattern of (−)(+)(−)(−). But, the invention is not limited thereto.

The second pixel column is disposed between the third and fourth data lines DL3 and DL4 and no pixels are disposed between the second and third data lines DL2 and DL3. In one embodiment, for example, the second and third data lines DL2 and DL3 receive data voltages of the same polarity, and the third and fourth data lines DL3 and DL4 receive data voltages of different polarities. In such an embodiment, the second and third data lines DL2 and DL3 receive a data voltage of a (−) polarity, and the third and fourth data lines DL3 and DL4 receive a data voltage of a (−) polarity and a data voltage of a (+) polarity, respectively.

In such an embodiment, the first to fourth pixels PX1 to PX4 of the first dot DOT1 disposed in the second pixel column have opposite polarities to the first to fourth pixels PX1 to PX4 of the first dot DOT1 disposed in the first pixel column. Therefore, the pixels of each pixel row may have a polarity inverted by each pixel unit (or by every pixel) in the first direction DR1.

In an embodiment, as shown in FIG. 3, the data lines DL1 to DL6 receive data voltages having polarities of (+)(−)(−)(+) by each unit of the four data lines DL1 to DL4, but the invention is not limited thereto.

In an embodiment, as shown in FIG. 3, a pixel electrode has a rectangular pixel structure, but the invention is not limited thereto.

Figure 4A:
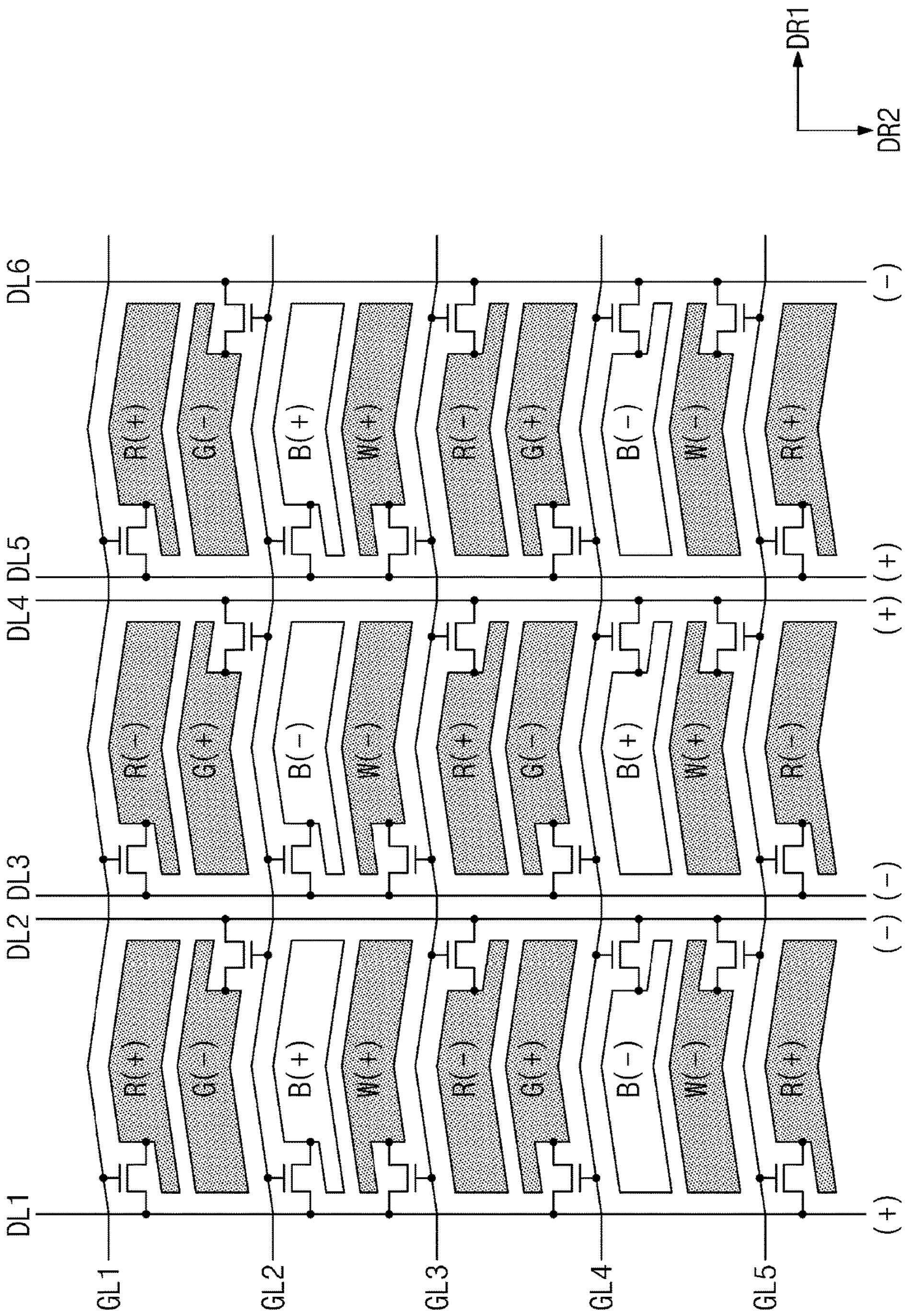
FIG. 4A is a schematic circuit diagram illustrating a state in which the third pixel having a blue color is turned on among the pixels shown in FIG. 3.
Figure 4B:
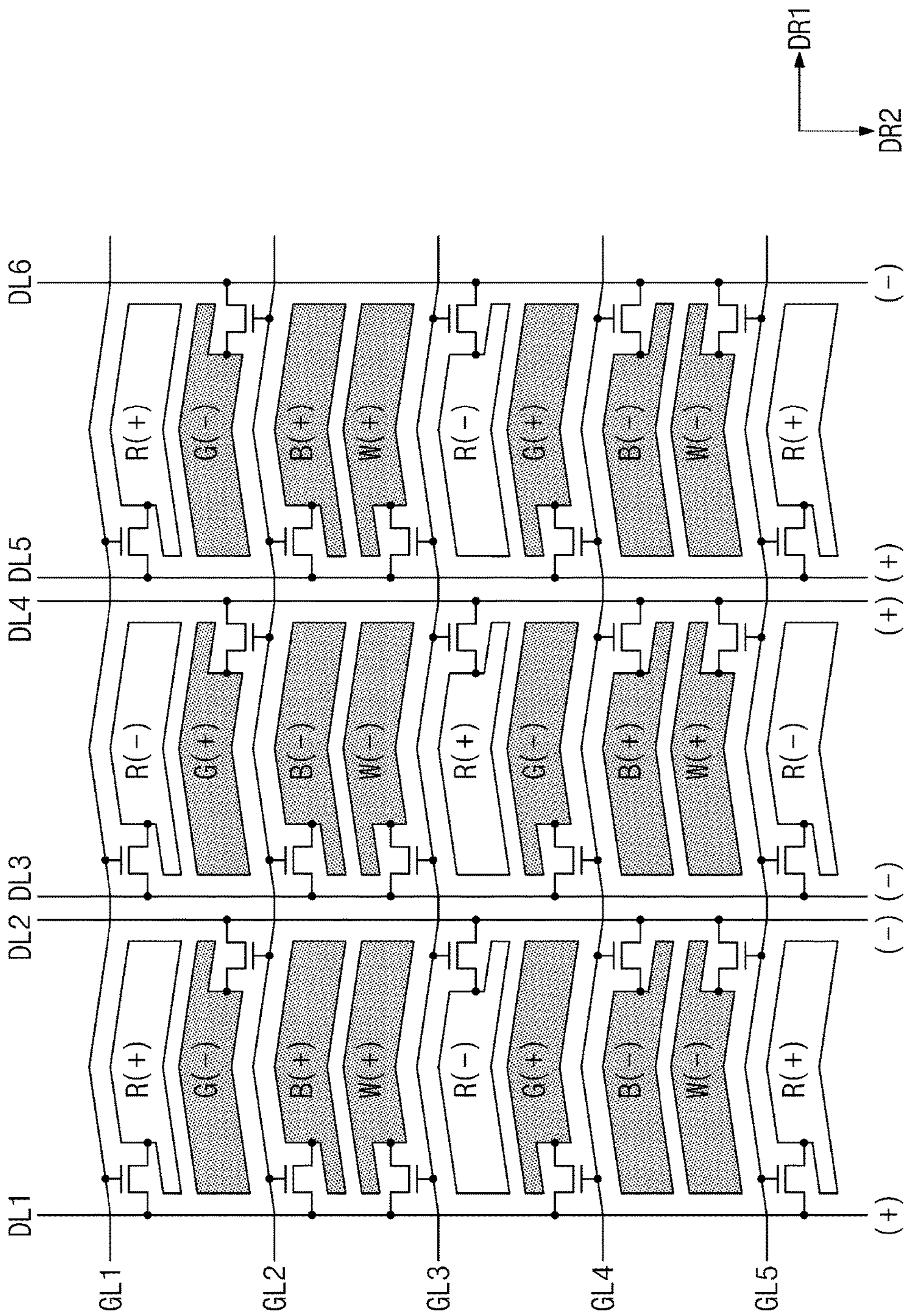
FIG. 4B is a schematic circuit diagram illustrating a state in which the first pixel having a red color is turned on among the pixels shown in FIG. 3.
Figure 4C:
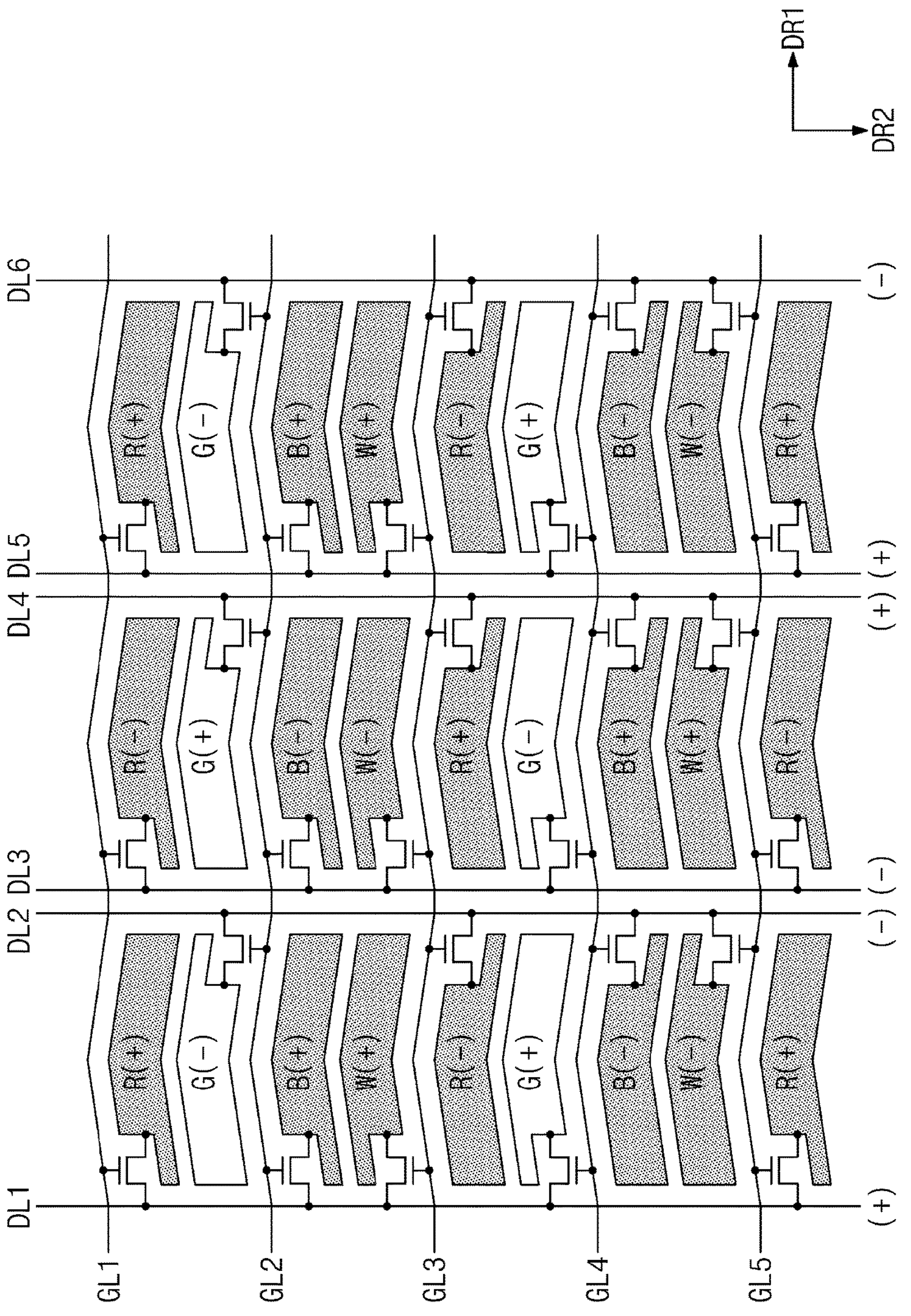
FIG. 4C is a schematic circuit diagram illustrating a state in which the second pixel having a green color is turned on among the pixels shown in FIG. 3.
Figure 4D:
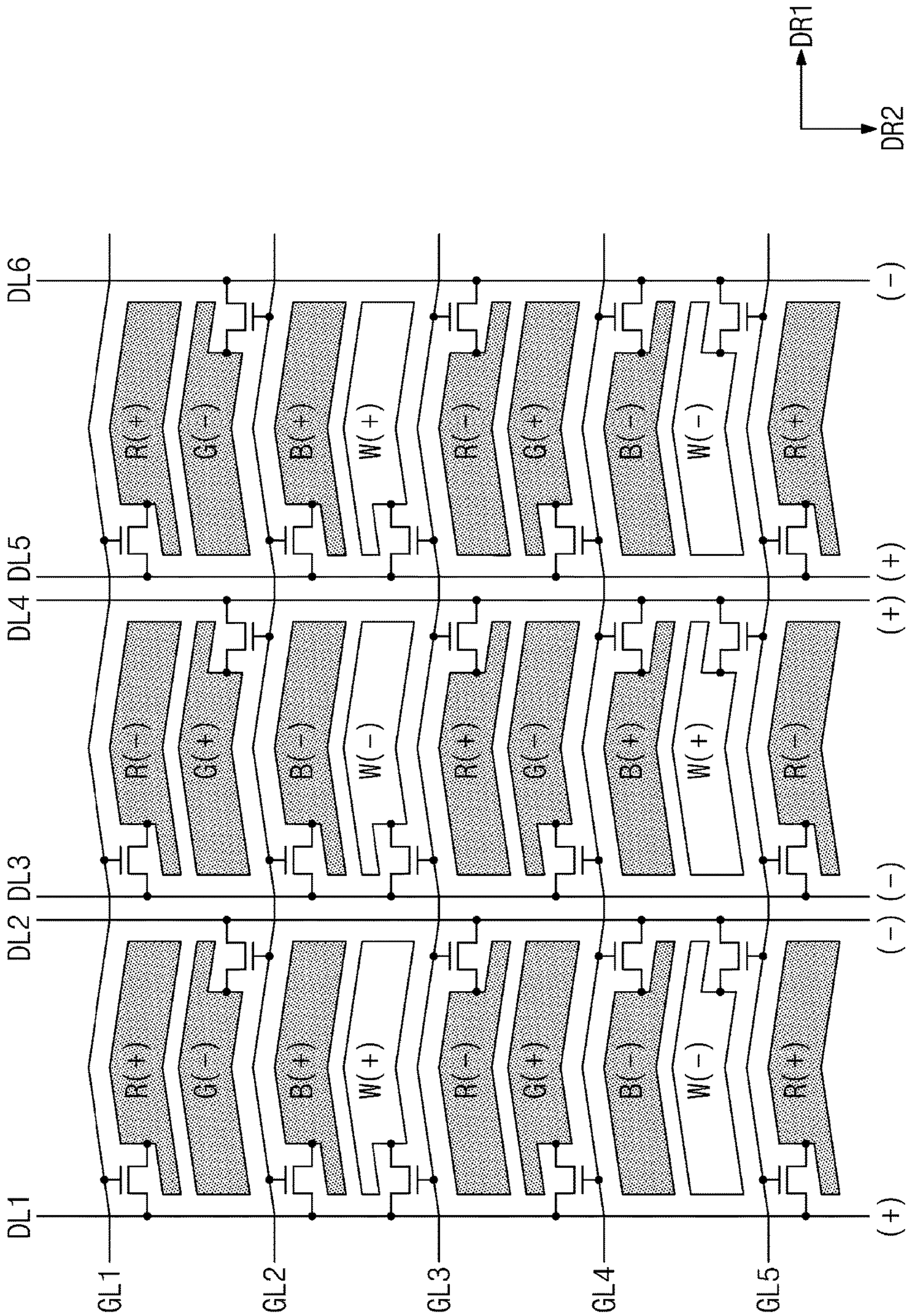
FIG. 4D is a schematic circuit diagram illustrating a state in which the fourth pixel having a white color is turned on among the pixels shown in FIG. 3.

FIG. 4A is a schematic circuit diagram illustrating a state in which the third pixel having a blue color is turned on among the pixels shown in FIG. 3, and FIG. 4B is a schematic circuit diagram illustrating a state in which the first pixel having a red color is turned on among the pixels shown in FIG. 3. FIG. 4C is a schematic circuit diagram illustrating a state in which the second pixel having a green color is turned on among the pixels shown in FIG. 3, and FIG. 4D is a schematic circuit diagram illustrating a state in which the fourth pixel having a white color is turned on among the pixels shown in FIG. 3.

Although FIGS. 4A to 4D show an embodiment having the pixel structure in that a pixel electrode has a V-like shape and a V-like shaped slit (not shown) is defined in the pixel electrode, the connection structure of pixels with data lines and gate lines is the same as that of the embodiment shown in FIG. 3.

Referring to FIG. 4A, when each of the first and second dots DOT1 and DOT2 represents a blue color as a representative color, the third pixels PX3 having the blue color among the first to fourth pixels PX1 to PX4 are turned on and the remaining first, second, and fourth pixels PX1, PX2, and PX4 are turned off.

In such an embodiment, as shown in FIG. 4A, the turned-on third pixels PX3 have different polarities in the first and second directions DR1 and DR2.

In such an embodiment, the third pixels PX3 having a (+) polarity and the third pixels PX3 having a (−) polarity are alternately arranged in the row direction and the column direction. Therefore, in such an embodiment, the common voltage does not ripple in a positive direction or a negative direction with respect to a reference voltage, such that the vertical and horizontal flicker shapes or the crosstalk phenomenon may be effectively prevented.

In such an embodiment, since pixels of a (−) polarity and a (+) polarity are mixed in one row and one column, moving vertical lines (or horizontal lines) that occur when one row or one column includes only a group of pixels having any one polarity do not occur. Thus, the image quality of a liquid crystal display device may be improved as a whole.

Referring to FIGS. 4B to 4D, even when a monochrome screen is implemented by red, green, and white colors in addition to a blue color, one row and one column are not formed of a group of pixels having any one polarity, and a (+) polarity and a (−) polarity are mixed. Therefore, flicker, moving vertical lines (or horizontal lines), and crosstalk phenomena do not occur. Thus, the image quality of a liquid crystal display device may be improved as a whole.

Figure 5A:
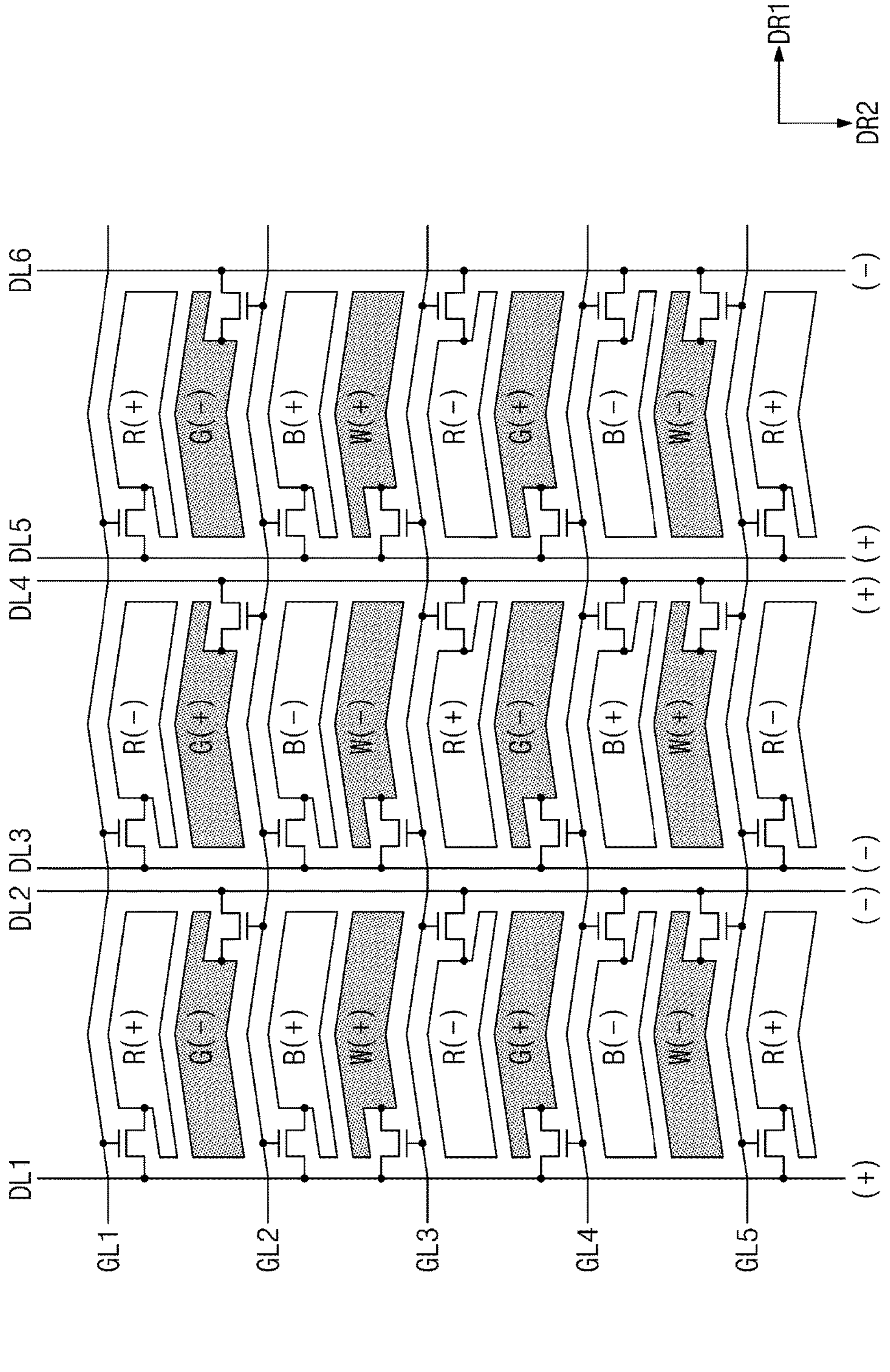
FIG. 5A is a schematic circuit diagram illustrating a state in which the first and third pixels having red and blue colors are turned on among the pixels shown in FIG. 3.
Figure 5B:
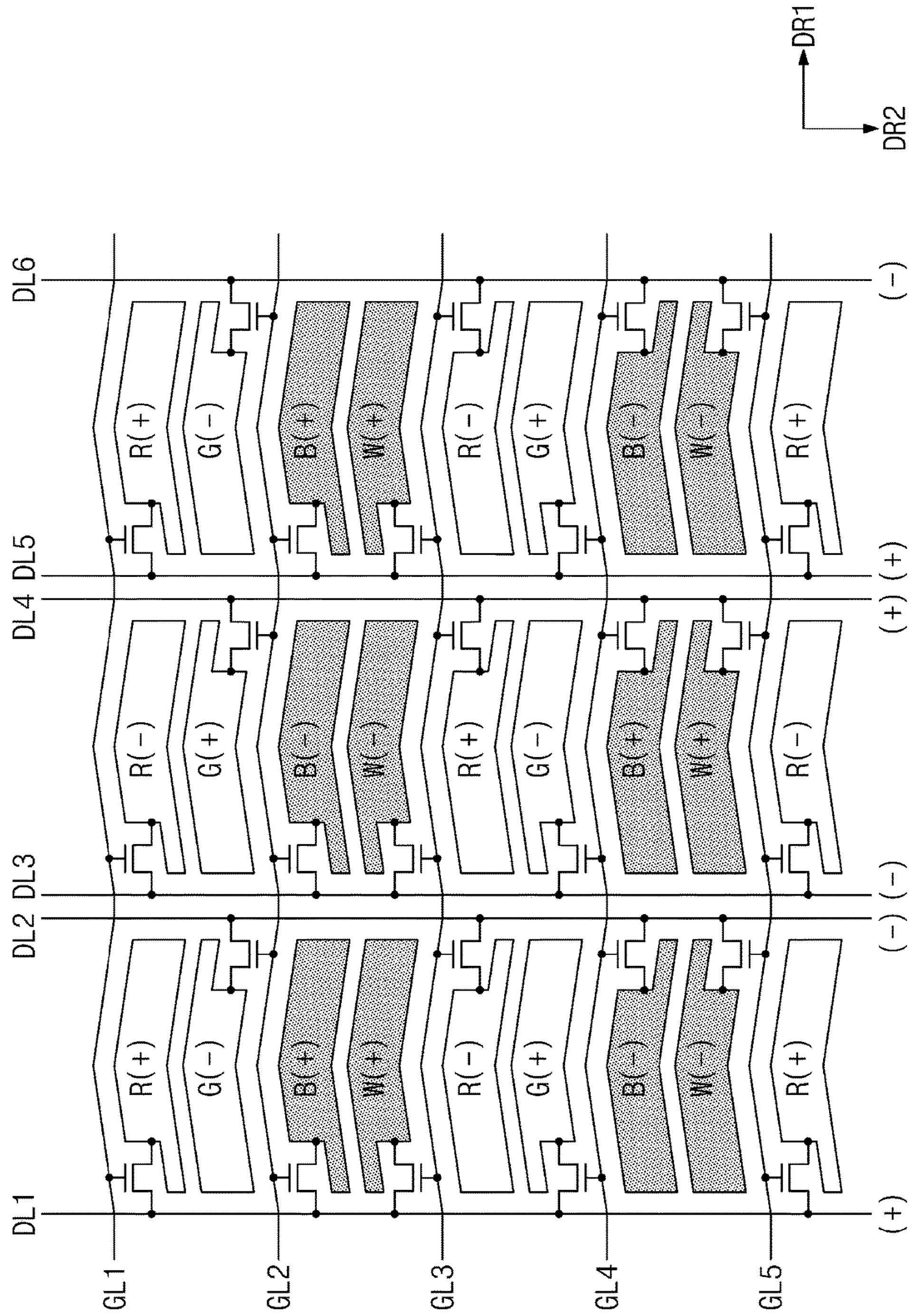
FIG. 5B is a schematic circuit diagram illustrating a state in which the first and second pixels having red and green colors are turned on among the pixels shown in FIG. 3.
Figure 5C:
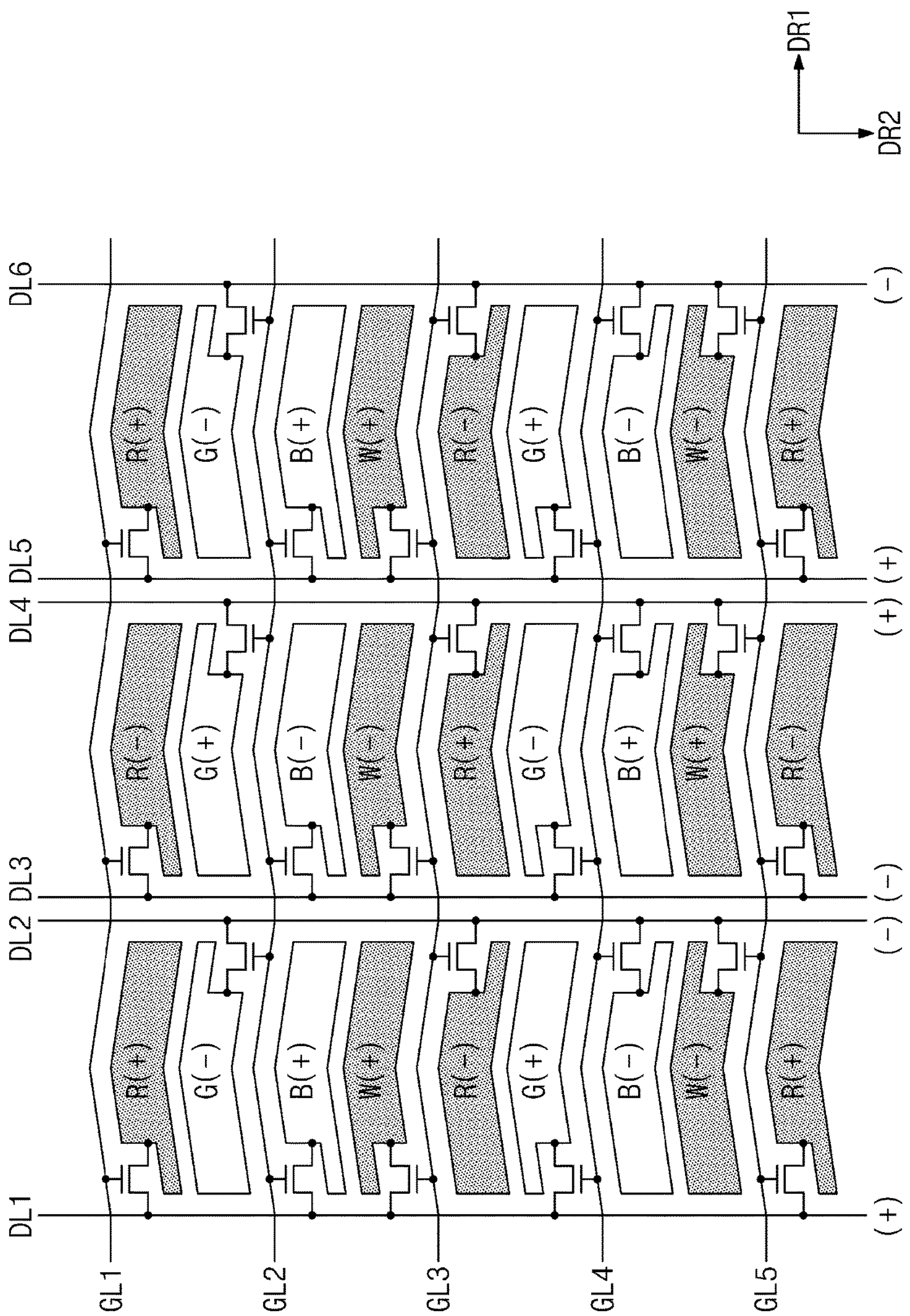
FIG. 5C is a schematic circuit diagram illustrating a state in which the second and third pixels having green and blue colors are turned on among the pixels shown in FIG. 3.
Figure 5D:
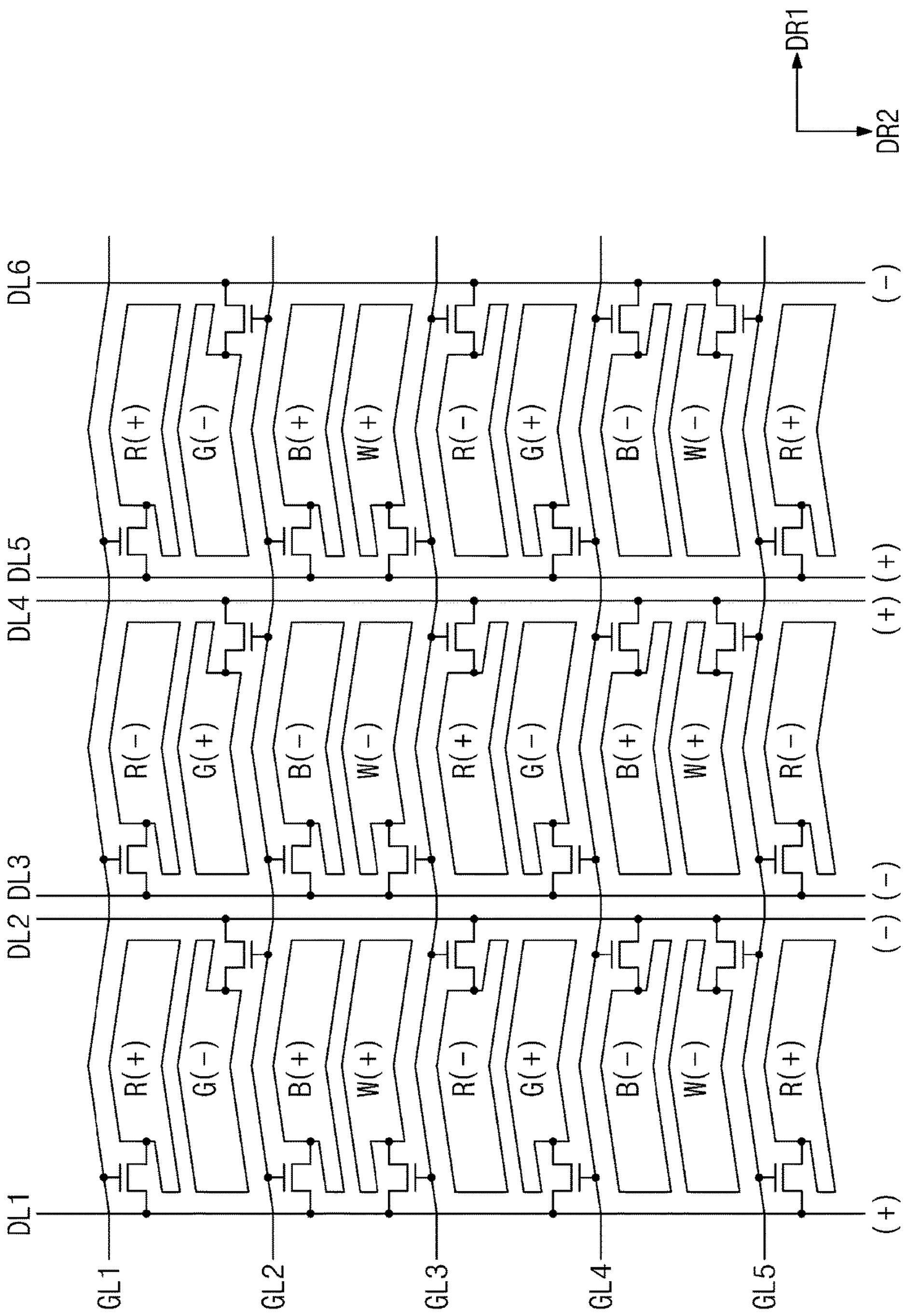

FIG. 5A is a schematic circuit diagram illustrating a state in which the first and third pixels having red and blue colors are turned on among the pixels shown in FIG. 3, and FIG. 5B is a schematic circuit diagram illustrating a state in which the first and second pixels having red and green colors are turned on among the pixels shown in FIG. 3. FIG. 5C is a schematic circuit diagram illustrating a state in which the second and third pixels having green and blue colors are turned on among the pixels shown in FIG. 3, and FIG. 5D is a schematic circuit diagram illustrating a state in which the first to fourth pixels shown in FIG. 3 are turned on.

Referring to FIG. 5A, when each of the first and second dots DOT1 and DOT2 represents a magenta color as a representative color, the first pixels PX1 having the red color and the third pixels PX3 having the blue color among the first to fourth pixels PX1 to PX4 are turned on and the second and fourth pixels PX2 and PX4 having the remaining green and white colors are turned off.

When the first pixels PX1 having the red color and the third pixels PX3 having the blue color among the first to fourth pixels PX1 to PX4 are turned on and the second and fourth pixels PX2 and PX4 having the remaining green and white colors are turned off, the first pixels PX1 have different polarities in the first and second directions DR1 and DR2, and the third pixels PX3 also have different polarities in the first and second directions DR1 and DR2. In such an embodiment, the first pixels PX1 having a (+) polarity and the first pixels PX1 having a (−) polarity are arranged alternately in the row direction and the column direction. In such an embodiment, the third pixels PX3 having a (+) polarity and the third pixels PX3 having a (−) polarity are arranged alternately in the row direction and the column direction. Therefore, in such an embodiment, the common voltage does not ripple in a positive direction or a negative direction with respect to a reference voltage, such that the vertical and horizontal flicker shapes or the crosstalk phenomenon may be prevented.

In such an embodiment, since pixels of a (−) polarity and a (+) polarity are mixed in one row and one column, moving vertical lines (or horizontal lines) that occur when one row or one column includes only a group of pixels having a polarity do not occur. Thus, the image quality of a liquid crystal display device may be improved as a whole.

Referring to FIG. 5B, when each of the first and second dots DOT1 and DOT2 represents a yellow color as a representative color, the first pixels PX1 having the red color and the second pixels PX2 having the green color among the first to fourth pixels PX1 to PX4 are turned on and the third and fourth pixels PX3 and PX4 having the remaining blue and white colors are turned off.

When the first pixels PX1 having the red color and the second pixels PX2 having the green color among the first to fourth pixels PX1 to PX4 are turned on and the third and fourth pixels PX3 and PX4 having the remaining blue and white colors are turned off, the first pixels PX1 having a (+) polarity and the first pixels PX1 having a (−) polarity are arranged alternately in the row direction and the column direction. In such an embodiment, the second pixels PX2 having a (+) polarity and the second pixels PX2 having a (−) polarity are arranged alternately in the row direction and the column direction.

In such an embodiment, pixels of a (−) polarity and a (+) polarity are mixed in one row and one column, such that moving vertical lines (or horizontal lines) and crosstalk phenomena do not occur.

Referring to FIG. 5C, when each of the first and second dots DOT1 and DOT2 represents a cyan color as a representative color, the second pixels PX2 having the green color and the third pixels PX3 having the blue color among the first to fourth pixels PX1 to PX4 are turned on and the first and fourth pixels PX1 and PX4 having the remaining red and white colors are turned off.

When the second pixels PX2 having the green color and the third pixels PX3 having the blue color among the first to fourth pixels PX1 to PX4 are turned on and the first and fourth pixels PX1 and PX4 having the remaining red and white colors are turned off, the second pixels PX2 having a (+) polarity and the second pixels PX2 having a (−) polarity are arranged alternately in the row direction and the column direction, and the third pixels PX3 having a (+) polarity and the third pixels PX3 having a (−) polarity are arranged alternately in the row direction and the column direction.

Since one row and one column do not include a group of pixels having any one polarity and have a structure that pixels of a (−) polarity and a (+) polarity are mixed, moving vertical lines (or horizontal lines) and crosstalk phenomena do not occur.

Referring to FIG. 5D, when each of the first and second dots DOT1 and DOT2 represents a white color as a representative color, the first to fourth pixels PX1 to PX4 are all turned on.

When the first to fourth pixels PX1 to PX4 are all turned on, the first to fourth pixels PX1 to PX4 having a (+) polarity and the first to fourth pixels PX1 to PX4 having a (−) polarity are alternately arranged in the row direction and the column direction.

Pixels having the same color in one row and one column may include groups of pixels having different polarities, and a (−) polarity and a (+) polarity may be mixed. Therefore, flicker, moving vertical lines (or horizontal lines), and crosstalk phenomena do not occur.

Thus, in such an embodiment, the image quality of a liquid crystal display device may be improved even in the case of implementing a mixed color screen and also in the case of implementing a monochromatic screen, as described above.

Figure 6:
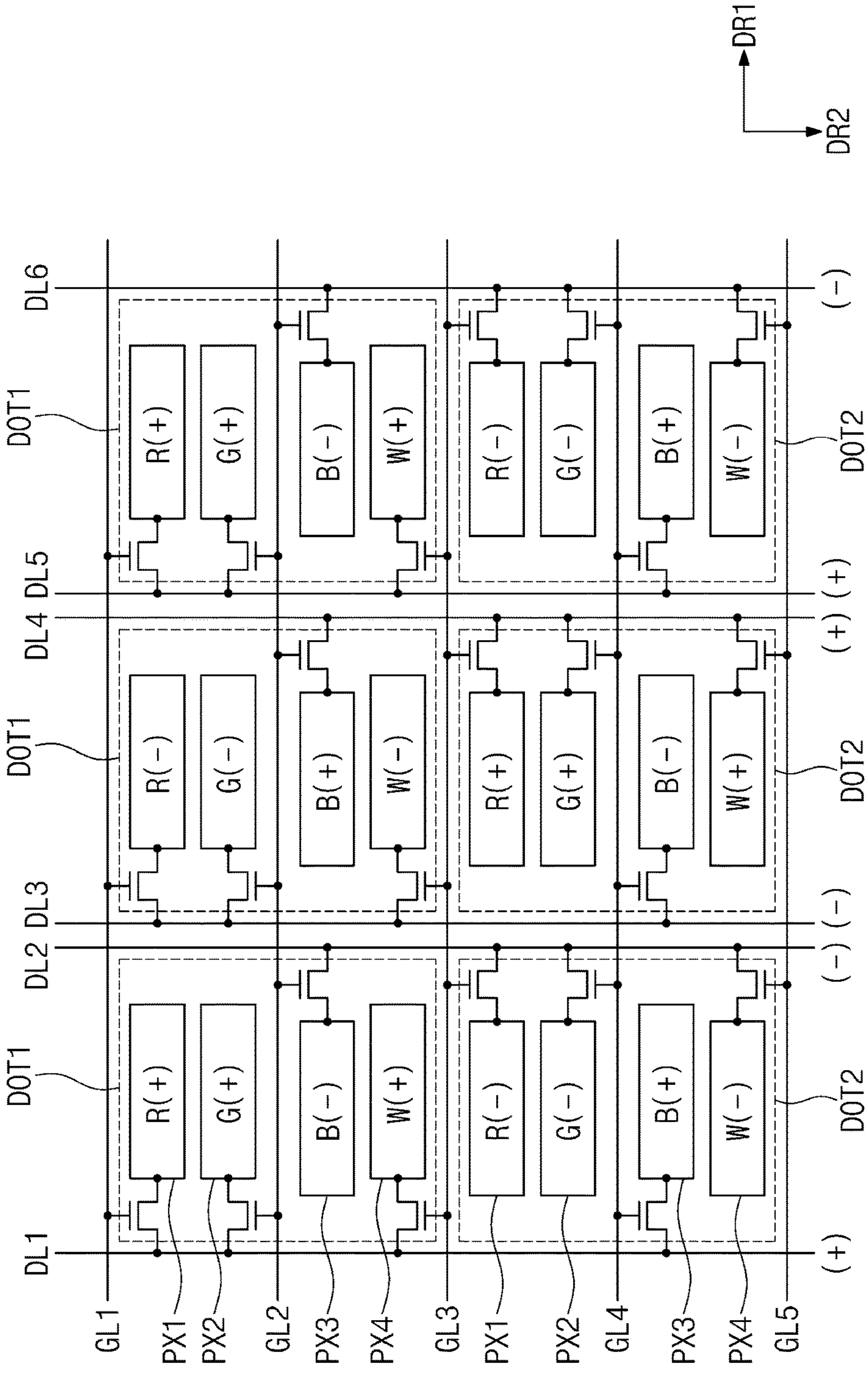
FIG. 6 is a schematic circuit diagram illustrating a part of a liquid crystal panel according to an alternative embodiment of the invention.

FIG. 6 is a schematic circuit diagram illustrating a part of a liquid crystal panel according to an alternative embodiment of the invention.

Referring to FIG. 6, an alternative embodiment of a liquid crystal panel according to the invention includes a plurality of first dots DOT1 and a plurality of second dots DOT2. The first dot DOT1 and the second dot DOT2 are alternately arranged in the second direction DR2. The same dots may be arranged in the first direction DR1.

Each of the first and second dots DOT1 and DOT2 may include first to fourth pixels PX1, PX2, PX3 and PX4 sequentially arranged in the second direction DR2. The second and third pixels PX2 and PX3 sharing the second gate line GL2 among the first to fourth pixels PX1, PX2, PX3, and PX4 are connected to different data lines. In an embodiment, where the second pixel PX2 in the first pixel column disposed between the first and second data lines DL1 and DL2 is connected to the first data line DL1, the third pixel PX3 is connected to the second data line DL2.

In an embodiment, the first, second, and fourth pixels PX1, PX2, and PX4 of the first dot DOT1 in the first pixel column are connected to the first data line DL1, and the third pixel PX3 of the first dot DOT1 is connected to the second data line DL2. In such an embodiment, the first, second, and, fourth pixels PX1, PX2, and PX4 of the second dot DOT2 in the first pixel column are connected to the second data line DL2, and the third pixel PX3 of the second dot DOT2 is connected to the first data line DL1.

In an embodiment, as shown in FIG. 6, when a data signal of a (+) polarity is applied to the first data line DL1, a data voltage of a (−) polarity is applied to the second data line DL2. Therefore, the first, second, and fourth pixels PX1, PX2, and PX4 of the first dot DOT1 connected to the first data line DL1 among the first to fourth pixels PX1, PX2, PX3 and PX4 have the (+) polarity, and the third pixel PX3 of the first dot DOT1 has a (−) polarity different from that of the first, second and fourth pixels PX1, PX2 and PX4.

In an embodiment, as shown in FIG. 6, the first dot DOT1 has the first pattern of (+)(+)(−)(+) and the second dot DOT2 has the second pattern of (−)(−)(+)(−), but the invention is not limited thereto.

The second pixel column is disposed between the third and fourth data lines DL3 and DL4, and no pixel is disposed between the second and third data lines DL2 and DL3. In an embodiment, the second and third data lines DL2 and DL3 receive data voltages of a same polarity, and the third and fourth data lines DL3 and DL4 receive data voltages of different polarities. In one embodiment, for example, the second and third data lines DL2 and DL3 receive a data voltage of a (−) polarity, and the third and fourth data lines DL3 and DL4 receive a data voltage of a (−) polarity and a data voltage of a (+) polarity, respectively.

In such an embodiment, the first to fourth pixels PX1 to PX4 of the first dot DOT1 disposed in the second pixel column have opposite polarities to those of the first to fourth pixels PX1 to PX4 of the first dot DOT1 disposed adjacent thereto in the first pixel column. In such an embodiment, the pixels of each pixel row may have a polarity inverted by each pixel unit or every pixel in the first direction DR1.

Therefore, the first to fourth pixels PX1 to PX4 having a (+) polarity and the first to fourth pixels PX1 to PX4 having a (−) polarity are alternately arranged in the row direction and the column direction.

Pixels having a same color in one row and one column may include groups of pixels having different polarities, and pixels having a (−) polarity and a (+) polarity may be mixed. Therefore, flicker, moving vertical lines (or horizontal lines), and crosstalk phenomena do not occur.

Figure 7:
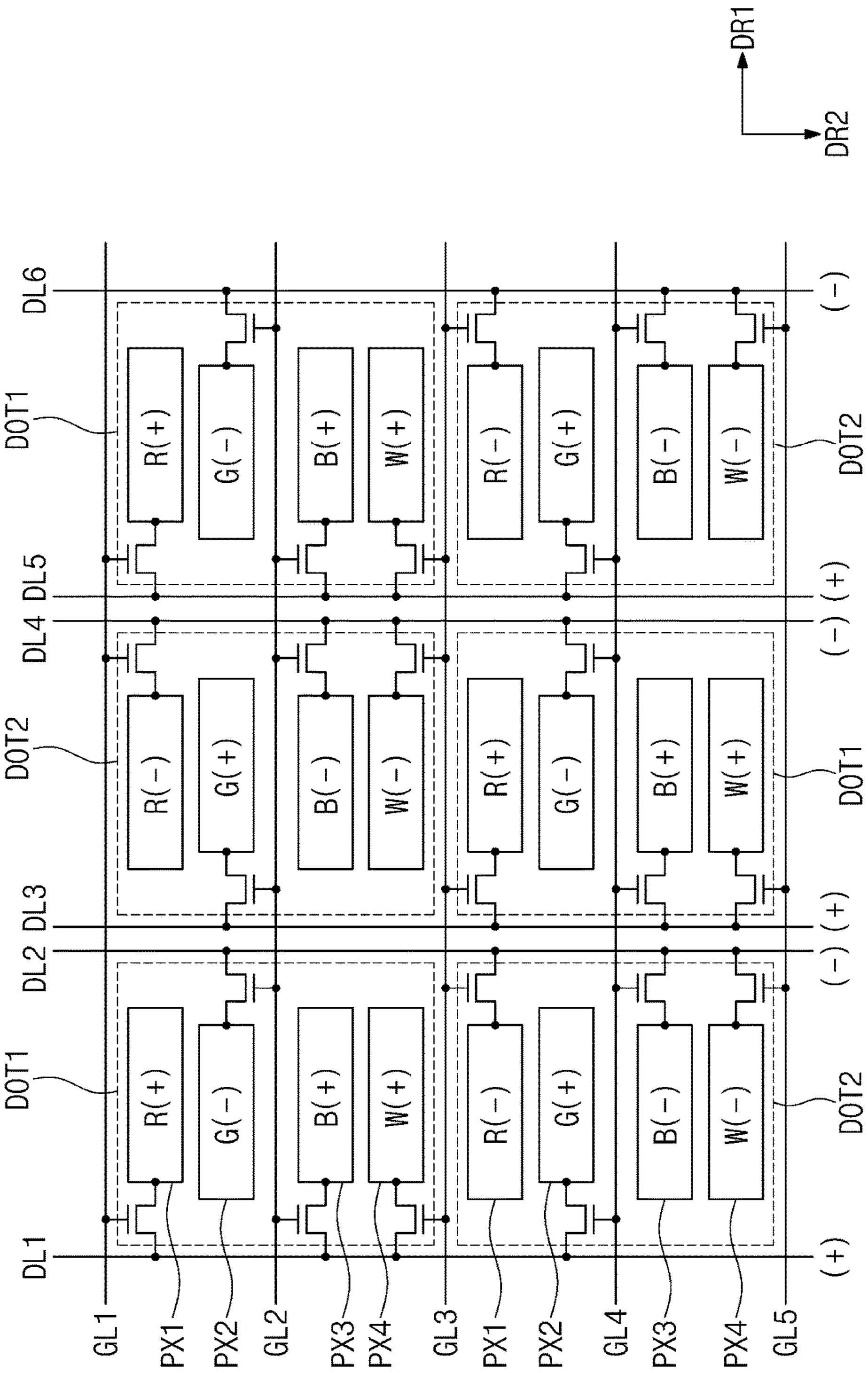
FIG. 7 is a schematic circuit diagram illustrating a part of a liquid crystal panel according to another alternative embodiment of the invention.

FIG. 7 is a schematic circuit diagram illustrating a part of a liquid crystal panel according to another alternative embodiment of the invention.

Referring to FIG. 7, another alternative embodiment of a liquid crystal panel according to the invention includes a plurality of first dots DOT1 and a plurality of second dots DOT2. The first dots DOT1 and the second dots DOT2 are alternately arranged in the first and second directions DR1 and DR2.

A set of dots arranged in the first direction DR1 is defined as a dot row, and a set of pixels in the second direction DR2 is defined as a pixel column. The first and second dots DOT1 and DOT2 are alternately arranged in the dot row and the first and second dots DOT1 and DOT2 are alternately arranged in the pixel column.

Each of the first and second dots DOT1 and DOT2 may include first to fourth pixels PX1, PX2, PX3 and PX4 sequentially arranged in the second direction DR2. The second and third pixels PX2 and PX3 sharing the second gate line GL2 among the first to fourth pixels PX1, PX2, PX3 and PX4 are connected to different data lines. In an embodiment, where the third pixel PX3 in the first pixel column disposed between the first and second data lines DL1 and DL2 is connected to the first data line DL1, the second pixel PX2 is connected to the second data line DL2.

In such an embodiment, the first, third and fourth pixels PX1, PX3 and PX4 of the first dot DOT1 in the first pixel column are connected to the first data line DL1, and the second pixel PX2 of the first dot DOT1 is connected to the second data line DL2. In such an embodiment, the first, third and, fourth pixels PX1, PX3 and PX4 of the second dot DOT2 in the first pixel column are connected to the second data line DL2, and the second pixel PX2 of the second dot DOT2 is connected to the first data line DL1.

In such an embodiment, as shown in FIG. 7, when a data signal of a (+) polarity is applied to the first data line DL1, a data signal of a (−) polarity is applied to the second data line DL2.

Therefore, the first, third and fourth pixels PX1, PX3 and PX4 connected to the first data line DL1 among the first to fourth pixels PX1, PX2, PX3 and PX4 have the (+) polarity, and the second pixel PX2 has a (−) polarity different from those of the first, third and fourth pixels PX1, PX3 and PX4.

In an embodiment, as shown in FIG. 7, the first dot DOT1 has the first pattern of (+)(−)(+)(+) and the second dot DOT2 has the second pattern of (−)(+)(−)(−), but the invention is not limited thereto.

The second pixel column is disposed between the third and fourth data lines DL3 and DL4 and no pixels are disposed between the second and third data lines DL2 and DL3. In an embodiment, the second and third data lines DL2 and DL3 receive data voltages of different polarities, and the third and fourth data lines DL3 and DL4 receive data voltages of different polarities. In one embodiment, for example, the second data line DL2 receives a data voltage of a (−) polarity, the third data line DL3 receives a data voltage of a (+) polarity, and the fourth data line DL4 receives a data voltage of a (−) polarity.

In such an embodiment, the first dot DOT1 is disposed in the first pixel column and the first dot row, and the second dot DOT2 is disposed in the first pixel column and the second dot row. In such an embodiment, the second dot DOT2 is disposed in the second pixel column and the first dot row, and the first dot DOT1 is disposed in the second pixel column and the second dot row.

The first to fourth pixels PX1 to PX4 of the first dot DOT1 have opposite polarities to those of the first to fourth pixels PX1 to PX4 of the second dot DOT2.

Therefore, the first to fourth pixels PX1 to PX4 having a (+) polarity and the first to fourth pixels PX1 to PX4 having a (−) polarity are alternately arranged in the row direction and the column direction.

Pixels having a same color in one row and one column may include groups of pixels having different polarities, and pixels having a (−) polarity and a (+) polarity may be mixed. Therefore, flicker, moving vertical lines (or horizontal lines), and crosstalk phenomena do not occur.

Figure 8:
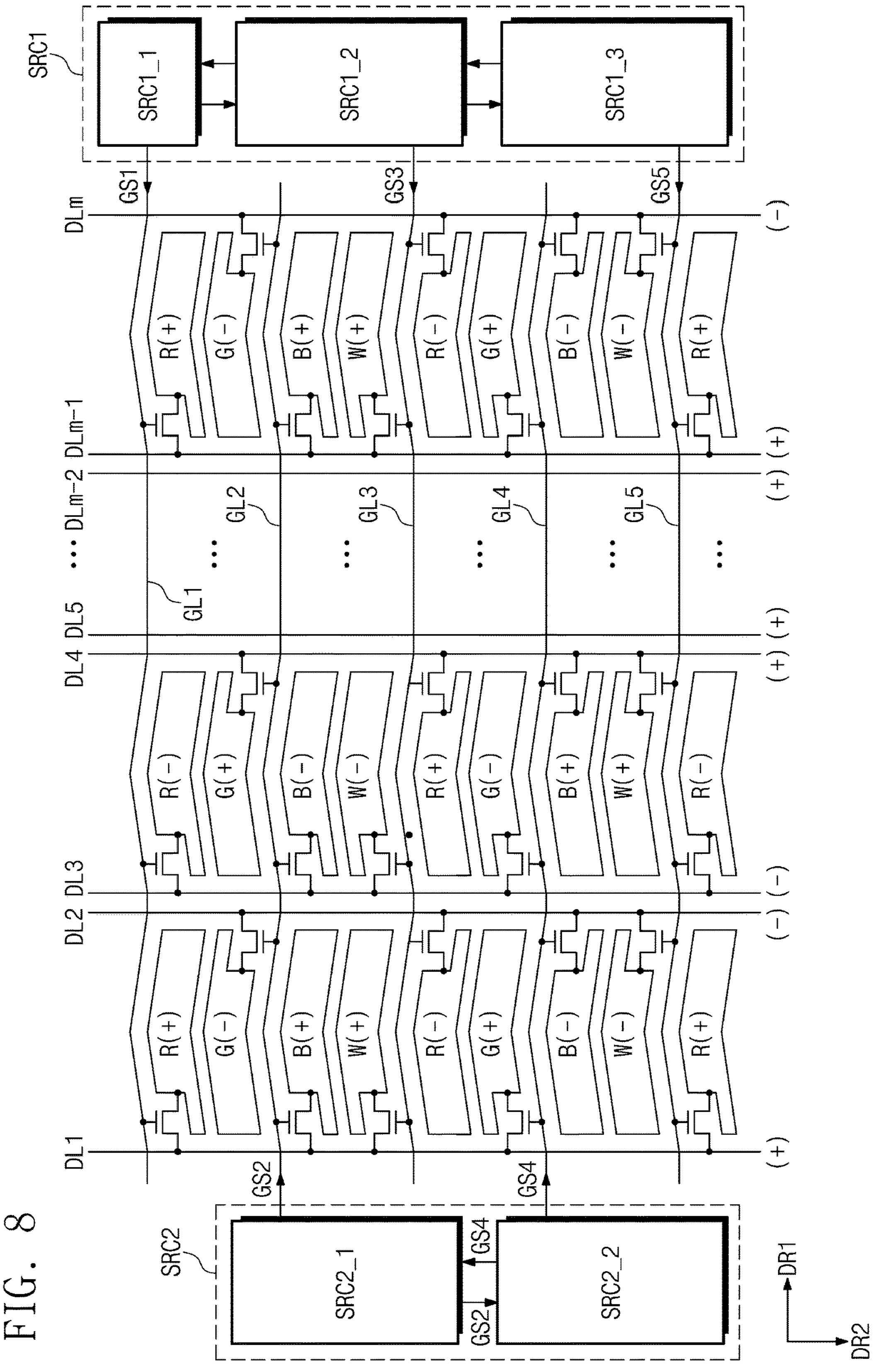
FIG. 8 is a block diagram illustrating a connection relationship between first and second gate driving units and first to fifth gate lines.
Figure 9:
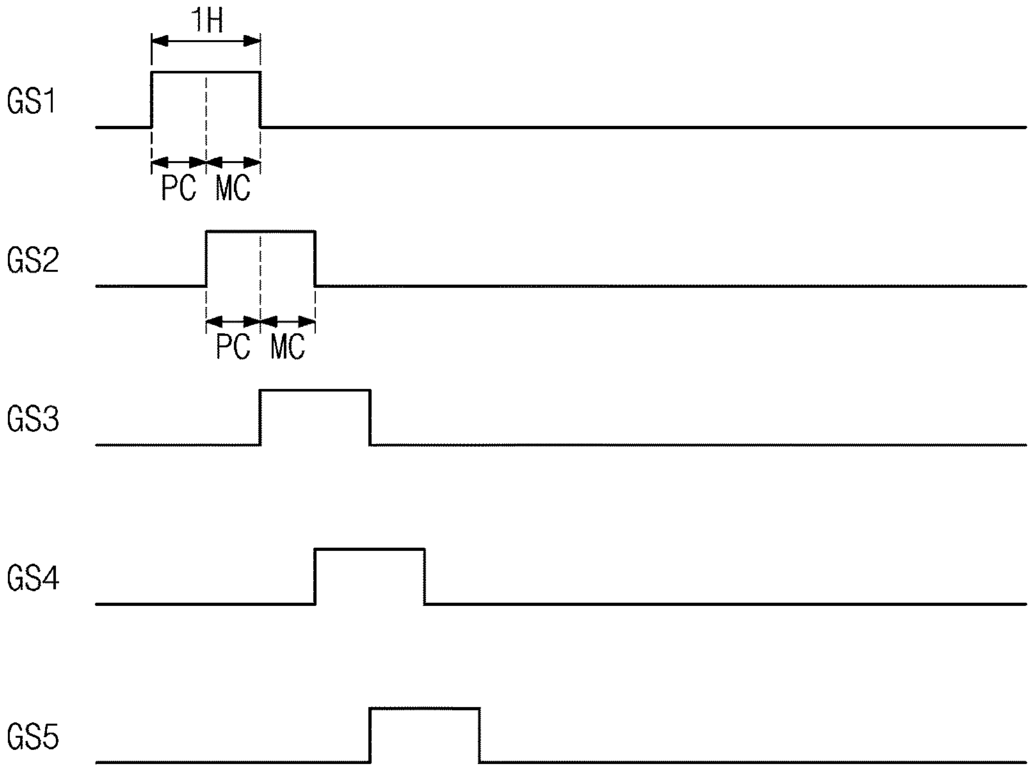
FIG. 9 is a signal timing diagram illustrating input/output waveforms of first and second gate driving units.

FIG. 8 is a block diagram illustrating a connection relationship between first and second gate driving units and first to fifth gate lines, and FIG. 9 is a signal timing diagram illustrating input/output waveforms of first and second gate driving units.

According to an embodiment of the invention, the first gate driving unit 130 shown in FIG. 1 is disposed on a right side of the plurality of gate lines GL1 to GL2*n* and includes a first shift register SRC1 connected to the odd gate lines among the plurality of gate lines GL1 to GL2*n*. The first shift register SRC1 includes n right stages connected in sequence.

The second gate driving unit 140 includes a second shift register SRC2 disposed on a left side of the plurality of gate lines GL1 to GL2*n* and connected to the even gate lines among the plurality of gate lines GL1 to GL2*n*. The second shift register SRC2 includes n left stages connected in sequence.

For convenience of illustration, FIG. 8 shows first, second and third right stages SRC1_1, SRC1_2 and SRC1_3 respectively connected to the first, third and fifth gate lines GL1, GL3 and GL5 among the n right stages, and first and second left stages SRC2_1 and SRC2_2 respectively connected to the second and fourth gate lines GL2 and GL4 among the n left stages.

The first, second and third right stages SRC1_1, SRC1_2 and SRC1_3 output first, third and fifth gate signals GS1, GS3 and GS5 to the first, third and fifth gate lines GL1, GL3 and GL5, respectively. The first and second left stages SRC2_1 and SRC2_2 output second and fourth gate signals GS2 and GS4 to the second and fourth gate lines GL2 and GL4, respectively.

As shown in FIG. 9, high sections of the two gate signals applied to two adjacent gate lines, respectively, overlap each other. In an embodiment, the high section of each gate signal is divided into a main charging section MC and a pre-charging section PC. In one embodiment, for example, the main charging section MC of the first gate signal GS1 may overlap the pre-charging section PC of the second gate signal GS2.

In one embodiment, for example, when the high section is defined as a 1H section, a former half of the 1H section may be defined as the pre-charging section PC, and the latter half of the 1H section may be defined as the main charging section MC. However, the widths of the main charging section MC and the pre-charging section PC are not limited thereto.

Figure 10:
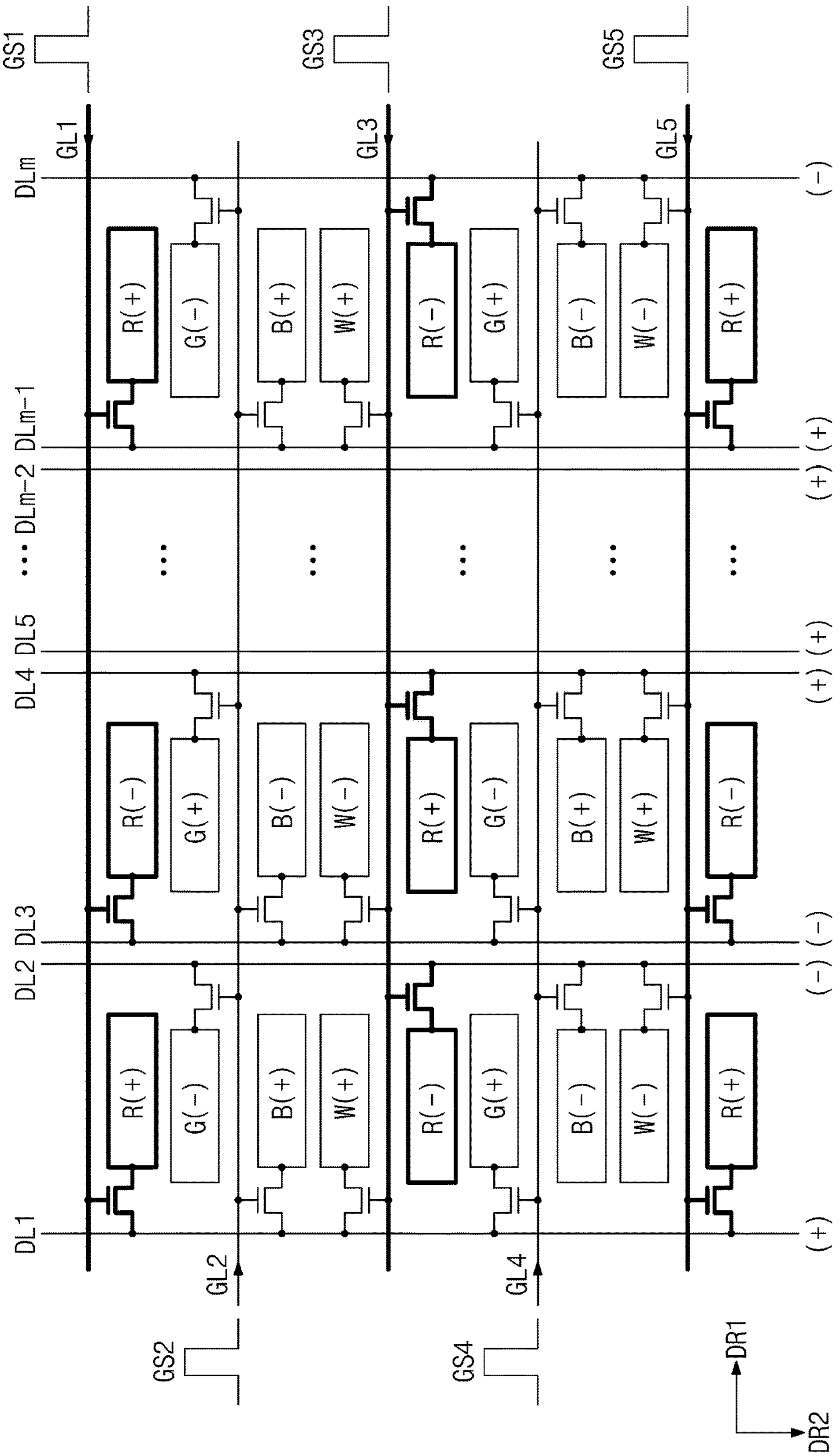
FIG. 10 is a schematic circuit diagram illustrating a gate signal and the color of a pixel that receives the gate signal.

FIG. 10 is a schematic circuit diagram illustrating a gate signal and the color of a pixel that receives the gate signal.

In an embodiment, as shown in FIG. 10, the first and fourth pixels PX1 and PX4 are connected to the odd gate lines GL1, GL3 and GL5 that receive a gate signal from the right end, and the second and third pixels PX2 and PX3 are connected to the even gate lines GL2 and GL4 that receive a gate signal from the left end.

In an embodiment, both the first pixels PX1 for displaying a red color and the fourth pixels PX4 for displaying a white color receive gate signals from the first gate driving unit 130 disposed on the right with respect to the gate lines. In such an embodiment, both the second pixels PX2 for displaying a green color and the fourth pixels PX4 for displaying a blue color receive gate signals from the second gate driving unit 140 disposed on the left with respect to the gate lines.

When gate signals are applied to the odd gate lines GL1, GL3, and GL5 from the right to the left, a brightness difference may occur between pixels connected to a right side of the odd lines GL1, GL3 and GL5 and pixels connected to a left side of the odd gate lines GL1, GL3 and GL5. When gate signals are applied to the even gate lines GL2 and GL4 from the left to the right, a brightness difference may occur between pixels connected to a left side of the even lines GL2 and GL4 and pixels connected to a right side of the even gate lines GL2 and GL4 *t*.

In an embodiment, as shown in FIG. 10, all pixels that display a same color are connected to a same gate driving unit. In such an embodiment, the first pixels PX1 of the first pixel row that display a red color are connected to the first gate driving unit 130 through the first gate line GL1, and the first pixels PX1 of the fifth pixel row that display the red color are connected to the first gate driving unit 130 through the third gate line GL3. Therefore, no brightness deviation occurs between the first pixels PX1 of the first pixel row and the first pixels PX1 of the fifth pixel row.

However, if the first pixels PX1 of the first pixel row receive gate signals from the first gate driving unit 130 and the first pixels PX1 of the fifth pixel row receive gate signals from the second gate driving unit 140, a brightness deviation may occur between the first pixels PX1 of the first pixel row and the first pixels PX1 of the fifth pixel row.

Therefore, according to an embodiment of the invention, pixels that display a same color are all connected to a same gate driving unit, a brightness deviation due to the delay of a gate signal from the left side and the right side of a gate line may not occur between the pixels that display the same color.

Although a dual gate structure in which the first and second gate driving units 130 and 140 are disposed on both left/right sides of the liquid crystal panel 110 is shown in FIGS. 1 and 10, the invention is not limited thereto. In an alternative embodiment, the liquid crystal display device 100 may have a single gate structure in which a gate driving unit is disposed on one side of the liquid crystal panel 110.

Figure 11:
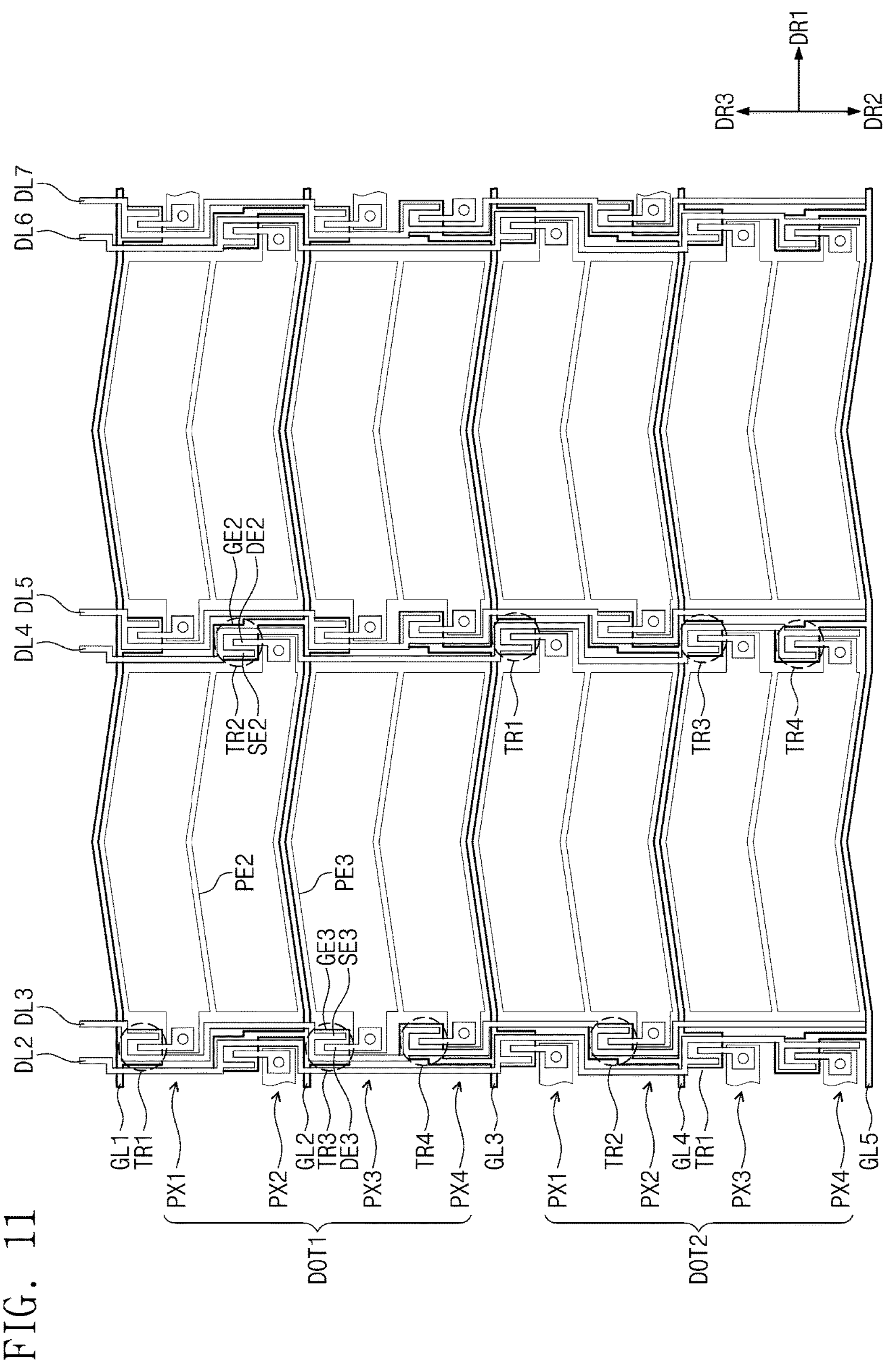
FIG. 11 is a plan view illustrating the first to fourth pixels of each of the first and second dots shown in FIG. 3.
Figure 12:
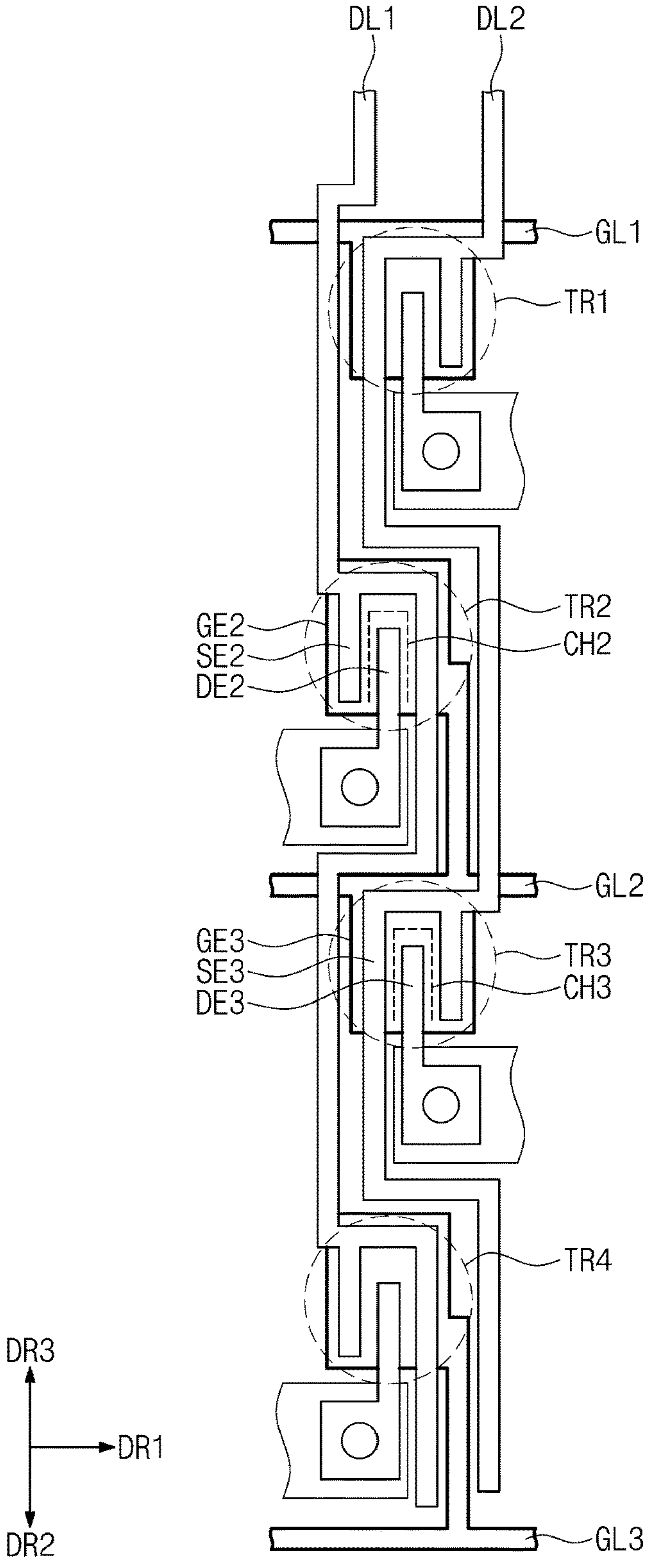
FIG. 12 is a plan view illustrating the thin film transistors of each of the first to fourth pixels shown in FIG. 11.

FIG. 11 is a plan view illustrating the layout of the first to fourth pixels of each of the first and second dots shown in FIG. 3, and FIG. 12 is a plan view illustrating the thin film transistors of each of the first to fourth pixels shown in FIG. 11.

Referring to FIG. 11, a width (hereinafter, referred to as a first horizontal width) in the first direction DR1 of each of the first to fourth pixels PX1, PX2, PX3 and PX4 is greater than a width (hereinafter, referred to as a first vertical width) in the second direction DR2 thereof. In an embodiment, the first horizontal width of each of the first to fourth pixels PX1, PX2, PX3 and PX4 is approximately three times the first vertical width. In such an embodiment, a width (hereinafter, referred to as a second vertical width) of each of the first and second dots DOT1 and DOT2 in the second direction DR2 is greater than a width (hereinafter, referred to as a second horizontal width) in the first direction DR1 thereof. In such an embodiment, the second vertical width of each of the first and second dots DOT1 and DOT2 may be greater than the second horizontal width by a size corresponding to the first vertical width.

The first to fourth pixels PX1 to PX4 include first to fourth thin film transistors TR1, TR2, TR3 and TR4, respectively. Two thin film transistors among the first to fourth thin film transistors TR1, TR2, TR3, and TR4 share one gate line or are connected to a same gate line.

In one embodiment, for example, the second and third thin film transistors TR1 and TR3 of the first dot DOT1 share the second gate line GL2, and the fourth thin film transistor TR4 of the first dot DOT1 and the first thin film transistor TR1 of the second dot DOT2 share the third gate line GL3.

Hereinafter, the second and third thin film transistors TR2 and TR3 sharing the second gate line GL2 will be described in detail. In such an embodiment, the first and fourth thin film transistors TR1 and TR4 have a similar structure as the second and third thin film transistors TR2 and TR3, and any repetitive detailed description thereof will be omitted for convenience of description.

The gate electrode GE3 of the third thin film transistor TR3 is branched from the second gate line GL2 in the second direction DR1, and the gate electrode GE2 of the second thin film transistor TR2 is branched from the second gate line GL2 in a third direction DR3 opposite to the second direction DR2.

For convenience of illustration, FIG. 11 shows the layout of the first and second dots DOT1 and DOT2 arranged in the second pixel column and the third pixel column, but the first and second dots DOT1 and DOT2 arranged in other pixel columns have a similar layout as the layout of the first and second dots DOT1 and DOT2 arranged in the second pixel column and the third pixel column.

The second pixel column is a group of pixels arranged in the second direction DR2 between the third data line DL3 and the fourth data line DL4, and the third pixel column is a group of pixels arranged in the second direction DR2 between the fifth data line DL5 and the sixth data line DL6.

The third thin film transistor TR3 includes a source electrode SE3 branched from the third data line DL3 and a drain electrode DE3 spaced apart from the source electrode SE3. The drain electrode DE3 is electrically connected to the third pixel electrode PE3 through a contact hole. The second thin film transistor TR2 includes a source electrode SE2 branched from the fourth data line DL4 and a drain electrode DE2 spaced apart from the source electrode SE2. The drain electrode DE2 is electrically connected to the second pixel electrode PE2 through a contact hole.

Referring to FIG. 12, each of the first to fourth thin film transistors TR1, TR2, TR3 and TR4 includes a U-like shaped channel. The channel of each of the first to fourth thin film transistors TR1, TR2, TR3, and TR4 may have a U-like shape rotated by 180° according to a viewing direction (hereinafter, referred to as an inverted U-like shape).

The channel may have a U-like shape or an inverted U-like shape depending on the viewing direction but the first to fourth thin film transistors TR1, TR2, TR3, and TR4 may have a U-like shape formed in the same direction. Here, if a channel direction of thin film transistors having the U-like shaped channel is defined as a forward direction channel, a channel direction of thin film transistors having the inverted U-like shaped channel is defined as a reverse direction channel.

As shown in FIG. 12, the first to fourth thin film transistors TR1 to TR4 all have reverse direction channels. That is, all the channel shapes and the channel directions of thin film transistors formed in the liquid crystal panel 110 (see FIG. 1) may be substantially the same as each other.

In such an embodiment, the second and third thin film transistors TR2 and TR3 include gate electrodes GE2 and GE3 that share one gate line GL2 or GL4 and are branched in different directions. In such an embodiment, the second channel CH2 of the second thin film transistor TR2 and the third channel CH3 of the third thin film transistor TR3 may have a same shape and channel direction as each other. In such an embodiment, the first and fourth thin film transistors TR1 and TR4 sharing the third and fifth gate lines GL3 and GL5 may have a same channel shape and channel direction as each other.

In such an embodiment, the channel shapes and the channel directions of thin film transistors included in upper/lower pixels are the same in a structure in which one gate line is shared by the upper/lower pixels, such that the deviation of a kickback voltage due to misalignment in manufacturing processes between thin film transistors is minimized during the process of designing thin film transistors.

According to embodiments of a display device of the invention, when column inversion is applied to a structure including four pixels with respective four colors, horizontal and vertical flicker defects are effectively prevented, and a pixel structure for preventing crosstalk phenomenon and moving line stain phenomenon is effectively realized, such that the overall image quality of the display device may be improved.

Although some exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display device comprising:
a plurality of gate lines extending in a first direction;
a plurality of data lines extending in a second direction intersecting the first direction; and
a plurality of pixels connected to the gate lines and the data lines,
wherein
a plurality of dots is defined by the pixels,
each of the dots comprises first to fourth pixels in a same pixel column arranged in the second direction,
the first to fourth pixels display first to fourth colors, respectively,
the first to fourth pixels are connected to two or three gate lines among the gate lines,
three pixels among the first to fourth pixels have a same polarity as each other, and
the remaining one pixel among the first to fourth pixels has a different polarity than the three pixels.

2. The display device of claim 1, wherein all pixels in a same pixel row arranged in the first direction display a same color.

3. The display device of claim 1, wherein
two pixels among the first to fourth pixels are connected to a same gate line.

4. The display device of claim 3, wherein the two pixels connected to the same gate line among the first to fourth pixels are connected to different data lines, respectively.

5. The display device of claim 1, wherein a width in the first direction of each of the pixels is greater than a width thereof in the second direction.

6. A display device comprising:
a plurality of gate lines extending in a first direction;
a plurality of data lines extending in a second direction intersecting the first direction; and
a plurality of pixels connected to the gate lines and the data lines,
wherein
a plurality of dots is defined by the pixels,
each of the dots comprises first to fourth pixels in a same pixel column arranged in the second direction,
the first to fourth pixels display first to fourth colors, respectively,
the first to fourth pixels are connected to two or three gate lines among the gate lines,
three pixels among the first to fourth pixels have a same polarity as each other, and
the remaining one pixel among the first to fourth pixels has a different polarity than the three pixels, wherein
each of the dots is defined by four pixels,
a dot of the dots is disposed between a k-th data line and a (k+1)-th data line, where k is an integer of 1 or greater,
a (k+2)-th data line is disposed adjacent to the (k+1)-th data line, and
no pixel is disposed between the (k+1)-th data line and the (k+2)-th data line.

7. The display device of claim 6, wherein data signals of different polarities are applied to the k-th data line and the (k+1)-th data line.

8. The display device of claim 7, wherein
the three pixels of the dot are connected to one of the k-th data line and the (k+1)-th data line, and
the remaining one pixel of the dot is connected to the other of the k-th data line and the (k+1)-th data line.

9. The display device of claim 8, wherein the (k+1)-th data line and the (k+2)-th data line receive data signals of a same polarity.

10. The display device of claim 9, wherein the dots comprises:
a first dot having a polarity arrangement of a first pattern in the second direction; and
a second dot having a polarity arrangement of a second pattern in the second direction,
wherein the first dot and the second dot are arranged alternately and repeatedly in the second direction.

11. The display device of claim 10, wherein
the first pattern is any one polarity pattern among (+)(−)(+)(+), (+)(+)(−)(+), (−) (+)(+)(+), and (+)(+)(+)(−), and
the second pattern is a pattern inverted from the first pattern.

12. The display device of claim 8, wherein the (k+1)-th data line and the (k+2)-th data line receive data signals of different polarities.

13. The display device of claim 12, wherein the dots comprises:
a first dot having a polarity arrangement of a first pattern in the second direction; and
a second dot having a polarity arrangement of a second pattern in the second direction,
wherein the first dot and the second dot are arranged alternatively and repeatedly in the first and second directions.

14. The display device of claim 1, wherein the first to fourth colors are four different colors.

15. The display device of claim 14, wherein the first to fourth colors are red, green, blue and white colors.

16. The display device of claim 1, further comprising:
a gate driver which supplies a gate signal to the gate lines,
wherein the gate driver comprises:
a first gate driver disposed on a first side based on the gate lines; and
a second gate driver disposed on a second side based on the gate lines.

17. The display device of claim 16, wherein
the first gate driver is connected to odd gate lines among the gate lines, and
the second gate driver is connected to even gate lines among the gate lines.

18. The display device of claim 17, wherein
the pixels in one pixel row arranged in the first direction display a same color,
the pixels in another pixel row arranged in the first direction display the same color, and
the pixels in the one pixel row and the pixels in the another pixel row are connected to a same gate driver among the first gate driver and the second gate driver.

19. The display device of claim 17, wherein
a turn-on section of an i-th gate signal applied to an i-th gate line among the gate lines overlaps a turn-on section of an (i+1)-th gate signal applied to an (i+1)-th gate line among the gate lines,
wherein i is an integer of 1 or greater.

20. The display device of claim 1, wherein
the first to fourth pixels comprise first to fourth transistors, respectively,
two transistors among the first to fourth transistors is connected to a same gate line among the gate lines, and
channel directions of the two transistors are the same as each other.

* * * * *